United States Patent
Mukherjee et al.

(10) Patent No.: US 10,560,963 B2
(45) Date of Patent: Feb. 11, 2020

(54) FIRST RADIO NODE AND METHOD THEREIN FOR PERFORMING A LISTEN-BEFORE-TALK (LBT) WITH A SELECTED LBT METHOD

(71) Applicant: Telefonaktiebolaget LM Ericsson (publ), Stockholm (SE)

(72) Inventors: Amitav Mukherjee, Fremont, CA (US); Jung-Fu Cheng, Fremont, CA (US); Sorour Falahati, Stockholm (SE); Havish Koorapaty, Saratoga, CA (US); Daniel Larsson, Stockholm (SE); Yu Yang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 63 days.

(21) Appl. No.: 15/524,985

(22) PCT Filed: Nov. 3, 2015

(86) PCT No.: PCT/SE2015/051157
§ 371 (c)(1),
(2) Date: May 5, 2017

(87) PCT Pub. No.: WO2016/072916
PCT Pub. Date: May 12, 2016

(65) Prior Publication Data
US 2017/0339721 A1  Nov. 23, 2017

Related U.S. Application Data

(60) Provisional application No. 62/076,642, filed on Nov. 7, 2014.

(51) Int. Cl.
*H04L 12/413* (2006.01)
*H04W 74/08* (2009.01)
(Continued)

(52) U.S. Cl.
CPC ....... *H04W 74/0816* (2013.01); *H04W 16/14* (2013.01); *H04W 28/08* (2013.01); *H04W 72/1247* (2013.01)

(58) Field of Classification Search
CPC ..... H04W 16/14; H04W 28/08; H04W 24/08; H04W 72/0453; H04W 84/12;
(Continued)

(56) References Cited

U.S. PATENT DOCUMENTS 8,774,209 B2   7/2014  Sadek et al.
9,420,472 B2 *  8/2016  Chen .................... H04W 16/14
(Continued)

FOREIGN PATENT DOCUMENTS

EP    1 460 809 A2    9/2004
RU    2139311 C2    3/2008

OTHER PUBLICATIONS

Office Action and Search Report and English translation thereof, issued in corresponding Russian Application No. 2017119661/08 (034206), consisting of 16 pages.
(Continued)

*Primary Examiner* — Hanh N Nguyen
(74) *Attorney, Agent, or Firm* — Christopher & Weisberg, P.A.

(57) ABSTRACT

A method performed by a first radio node to select a Listen-Before-Talk, LBT, method based on a type of information to be transmitted in a radio channel in unlicensed spectrum. The first radio node performs an LBT using the selected LBT method. When the information is data, the method includes always deferring transmission until: A) after completion of a first period of observation, an outcome of at least a second period of observation is that the channel is idle, or B) an outcome of a first period and one or more defer periods is that the channel is idle. When the informa-
(Continued)

tion is control or management information, the selected method includes allowing transmission immediately after an outcome of the first period is that the channel is idle. A duration of the first period provides priority to the control or management information over data.

21 Claims, 23 Drawing Sheets

(51) Int. Cl.
*H04W 16/14* (2009.01)
*H04W 28/08* (2009.01)
*H04W 72/12* (2009.01)

(58) Field of Classification Search
CPC . H04W 74/08; H04W 72/08; H04W 72/0426; H04W 74/0816; H04W 74/0841; H04W 74/0825; H04L 5/00; H04L 27/00; H04L 25/02
See application file for complete search history.

(56) References Cited

U.S. PATENT DOCUMENTS

| | | | | |
|---|---|---|---|---|
| 9,867,070 | B2* | 1/2018 | Luo | H04W 24/08 |
| 10,080,159 | B2* | 9/2018 | Valliappan | H04W 28/08 |
| 2002/0154653 | A1 | 10/2002 | Benveniste | |
| 2006/0034199 | A1 | 2/2006 | Chu et al. | |
| 2007/0206547 | A1 | 9/2007 | Gong et al. | |
| 2008/0240049 | A1 | 10/2008 | Gaur | |
| 2014/0031054 | A1 | 1/2014 | Zou et al. | |

OTHER PUBLICATIONS

Gahng-Seop Ahn, et al., Title: "Supporting Service Differentiation for Real-Time and Best-Effort Traffic in Stateless Wireless Ad Hoc Networks (SWAN)," Published In: IEEE Transactions on Mobile Computing, vol. 99(3):192-207, Dec. 16, 2002 consisting of 16-pages.
3GPP TSG RAN WG1, Meeting #79, R1-144701, Title: "LBT Enhancements for Licensed-Assisted Access", Source: Alcatel-Lucent Shanghai Bell et al., Conference Location and Date: San Francisco, USA; Nov. 17-21, 2014 consisting of 5-pages.
3GPP TSG RAN WG1 Meeting #79, R1-145193. Title: "Details of Listen-Before-Talk for LAA", Source: Ericsson. Conference Location and Date: San Francisco, USA; Nov. 17-21, 2014 consisting of 7-pages.
International Search Report and Written Opinion dated Mar. 16, 2016 for International Application Serial No. PCT/SE2015/051157, International Filing Date: Nov. 3, 2015 consisting of 15-pages.
Examination Report issued by the European Patent Office dated Jun. 15, 2018 in corresponding European Patent Application No. 15 804 986.6, consisting of 11 pages.
Russian Decision to Grant and English translation thereof, dated Aug. 28, 2019 issued in in corresponding Russian Application No. 2017119661/08 (034206), consisting of 21 pages.

* cited by examiner

FIRST RADIO NODE AND METHOD THEREIN FOR PERFORMING A LISTEN-BEFORE-TALK (LBT) WITH A SELECTED LBT METHOD

CROSS-REFERENCE TO RELATED APPLICATIONS

This application is a Submission Under 35 U.S.C. § 371 for U.S. National Stage Patent Application of International Application Number: PCT/SE2015/051157, filed Nov. 3, 2015 entitled "FIRST RADIO NODE AND METHOD THEREIN FOR PERFORMING A LISTEN-BEFORE-TALK (LBT) WITH A SELECTED LBT METHOD," which claims priority to U.S. Provisional Application No.: 62/076,642, filed Nov. 4, 2014, entitled "RADIO NODE AND METHOD THEREIN FOR TRANSMITTING IN A RADIO CHANNEL," the entirety of both which are incorporated herein by reference.

TECHNICAL FIELD

The present disclosure relates generally to a first radio node and methods therein for performing a Listen-Before-Talk (LBT) with a selected LBT method on a the radio channel. The present disclosure also relates generally to a computer program product, comprising instructions to carry out the actions described herein, as performed by the first radio node. The computer program product may be stored on a computer-readable storage medium.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. evolved NodeB "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The 3GPP initiative "License Assisted Access" (LAA) intends to allow LTE equipment to also operate in the unlicensed 5 GHz radio spectrum. The unlicensed 5 GHz spectrum is used as a complement to the licensed spectrum. Accordingly, devices may connect in the licensed spectrum, primary cell or PCell, and use carrier aggregation to benefit from additional transmission capacity in the unlicensed spectrum, secondary cell or SCell. To reduce the changes that may be required for aggregating licensed and unlicensed spectrum, the LTE frame timing in the primary cell may be simultaneously used in the secondary cell.

Regulatory requirements, however, may not permit transmissions in the unlicensed spectrum without prior channel sensing. Since the unlicensed spectrum may need to be shared with other radios of similar or dissimilar wireless technologies, a so called Listen-Before-Talk (LBT) method may need to be applied. Today, the unlicensed 5 GHz spectrum is mainly used by equipment implementing the IEEE 802.11 Wireless Local Area Network (WLAN) standard. This standard is known under its marketing brand "Wi-Fi."

In Europe, the LBT procedure is under the scope of EN 301.893 regulation. For LAA to operate in the 5 GHz spectrum, the LAA LBT procedure may conform to requirements and minimum behaviors set forth in EN 301.893. However, additional system designs and steps may be needed to ensure coexistence of Wi-Fi and LAA with EN 301.893 LBT procedures.

An example of an existing method is U.S. Pat. No. 8,774,209B2, "Apparatus and method for spectrum sharing using listen-before-talk with quiet periods," where LBT is adopted by frame-based OFDM systems to determine whether the channel is free prior to transmission. A maximum transmission duration timer is used to limit the duration of a transmission burst, and is followed by a quiet period.

Long Term Evolution (LTE)

LTE uses Orthogonal Frequency Division Multiplexing (OFDM) in the downlink and Discrete Fourier Transform (DFT)-spread OFDM, also referred to as single-carrier Frequency Division Multiple-Access (FDMA), in the uplink. The basic LTE downlink physical resource may thus be seen as a time-frequency grid as illustrated in FIG. 1, where each resource element corresponds to one OFDM subcarrier during one OFDM symbol interval. The uplink subframe has the same subcarrier spacing as the downlink and the same number of Single-Carrier (SC)-FDMA symbols in the time domain as OFDM symbols in the downlink.

In the time domain, LTE downlink transmissions may be organized into radio frames of 10 millisecond (ms), each radio frame consisting of ten equally-sized subframes of length Tsubframe=1 ms, as shown in FIG. 2. For normal cyclic prefix, one subframe consists of 14 OFDM symbols. The duration of each symbol may be approximately 71.4 μs.

Furthermore, the resource allocation in LTE is typically described in terms of resource blocks, where a resource block corresponds to one slot, 0.5 ms, in the time domain and 12 contiguous subcarriers in the frequency domain. A pair of two adjacent resource blocks in time direction, 1.0 ms, may be known as a resource block pair. Resource blocks may be numbered in the frequency domain, starting with 0 from one end of the system bandwidth.

Downlink transmissions may be dynamically scheduled, i.e., in each subframe the base may station transmit control information about which terminals data is transmitted to and upon which resource blocks the data is transmitted, in the current downlink subframe. This control signaling may be typically transmitted in the first 1, 2, 3 or 4 OFDM symbols in each subframe, and the number n=1, 2, 3 or 4 may be known as the Control Format Indicator (CFI). The downlink subframe may also contain common reference symbols, which are known to the receiver and used for coherent demodulation of, e.g., the control information. A downlink system with CFI=3 OFDM symbols as control is illustrated in FIG. 3, where the three OFDM symbols are indicated as control region. The control signaling is transmitted in the first OFDM symbol, as indicated.

From LTE Rel-11 onwards, above described resource assignments may also be scheduled on the enhanced Physical Downlink Control Channel (EPDCCH). For Rel-8 to Rel-10, only the Physical Downlink Control Channel (PDCCH) may be available.

The reference symbols shown in the above FIG. 3 may be the cell specific reference symbols (CRS) and may be used to support multiple functions, including fine time and frequency synchronization and channel estimation for certain transmission modes.

Physical Downlink Control Channel (PDCCH) and Enhanced PDCCH (EPDCCH)

The PDCCH/EPDCCH may be used to carry Downlink Control Information (DCI), such as scheduling decisions and power-control commands. More specifically, the DCI may include:

a) Downlink scheduling assignments, including PDSCH resource indication, transport format, hybrid-Automatic Repeat reQuest (ARQ) information, and control information related to spatial multiplexing, if applicable. A downlink scheduling assignment may also include a command for power control of the Physical Uplink Control Channel (PUCCH) used for transmission of hybrid-ARQ acknowledgements in response to downlink scheduling assignments.

b) Uplink scheduling grants, including Physical Uplink Shared Channel (PUSCH) resource indication, transport format, and hybrid-ARQ-related information. An uplink scheduling grant may also include a command for power control of the PUSCH.

c) Power-control commands for a set of terminals as a complement to the commands included in the scheduling assignments/grants.

One PDCCH/EPDCCH may carry one DCI message containing one of the groups of information listed above. As multiple terminals may be scheduled simultaneously, and each terminal may be scheduled on both downlink and uplink simultaneously, there may need to be a possibility to transmit multiple scheduling messages within each subframe. Each scheduling message may be transmitted on separate PDCCH/EPDCCH resources, and consequently, there may be typically multiple simultaneous PDCCH/EPDCCH transmissions within each subframe in each cell.

Furthermore, to support different radio-channel conditions, link adaptation may be used, where the code rate of the PDCCH/EPDCCH may be selected by adapting the resource usage for the PDCCH/EPDCCH, to match the radio-channel conditions.

Carrier Aggregation

The LTE Rel-10 standard may support bandwidths larger than 20 MegaHertz (MHz). One requirement on LTE Rel-10 may be to assure backward compatibility with LTE Rel-8. This may also include spectrum compatibility. That may imply that an LTE Rel-10 carrier, wider than 20 MHz, may appear as a number of LTE carriers to an LTE Rel-8 terminal. Each such carrier may be referred to as a Component Carrier (CC). In particular, for early LTE Rel-10 deployments it may be expected that there may be a smaller number of LTE Rel-10-capable terminals, compared to many LTE legacy terminals. Therefore, it may be necessary to assure an efficient use of a wide carrier also for legacy terminals, i.e. that it may be possible to implement carriers where legacy terminals may be scheduled in all parts of the wideband LTE Rel-10 carrier. The straightforward way to obtain this may be by means of Carrier Aggregation (CA). CA may imply that an LTE Rel-10 terminal may receive multiple CC, where the CC have, or at least the possibility to have, the same structure as a Rel-8 carrier. CA is illustrated in FIG. 4. Note an aggregated bandwidth of 100 MHz is shown as an aggregation of five CC, each of 20 MHz, and therefore each individual CC may be handled by a terminal from an earlier release than LTE Rel-10. A CA-capable UE may be assigned a primary cell (PCell) which may be always activated, and one or more secondary cells (SCells) which may be activated or deactivated dynamically.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

In addition, a feature of carrier aggregation is the ability to perform cross-carrier scheduling. This mechanism may allow a (E)PDCCH on one CC to schedule data transmissions on another CC by means of a 3-bit Carrier Indicator Field (CIF) inserted at the beginning of the (E)PDCCH messages. For data transmissions on a given CC, a UE may expect to receive scheduling messages on the (E)PDCCH on just one CC—either the same CC, or a different CC via cross-carrier scheduling; this mapping from (E)PDCCH to PDSCH may also be configured semi-statically.

Wireless Local Area Network

In typical deployments of WLAN, Carrier Sense Multiple Access with Collision Avoidance (CSMA/CA) may be used for medium access. This means that the channel may be sensed to perform a Clear Channel Assessment (CCA), and a transmission may be initiated only if the channel is declared as Idle. In case the channel is declared as Busy, the transmission may be deferred until the channel is deemed to be Idle. When the range of several Access Points (APs) using the same frequency may overlap, this means that all transmissions related to one AP may be deferred in case a transmission on the same frequency to or from another AP which is within range may be detected. Effectively, this means that if several APs are within range, they may have to share the channel in time, and the throughput for the individual APs may be severely degraded. A general illustration of the Listen-Before-Talk (LBT) mechanism is shown in FIG. 5.

After a Wi-Fi station (STA) A transmits a data frame to a station B, represented in the figure by the two wavy lines and the indication Busy Wireless Medium (WM), station B may transmit the ACK frame back to station A with a delay of 16 microseconds (μs), the so-called Short Inter-frame Spacing (SIFS). The SIFS duration may be understood as representing the nominal time, in μs, that the Wi-Fi Medium Access Control (MAC) and PHysical Layer (PHY) may require in order to receive the last symbol of a frame at the air interface, process the frame, and respond with the first symbol on the air interface of the earliest possible response frame. Such an ACK frame may be transmitted by station B without performing an LBT operation. To prevent another station interfering with such an ACK frame transmission, a station may defer for a duration of 34 μs, referred to as Distributed Coordination Function Inter-frame Spacing (DIFS), after the channel is observed to be occupied before assessing again whether the channel is occupied. This is represented in FIG. 5 as defer access.

Therefore, a station that wishes to transmit, may first perform a CCA by sensing the medium for a fixed duration DIFS. If the medium is idle, then the station may assume that it may take ownership of the medium and begin a frame exchange sequence. If the medium is busy, the station may wait for the medium to go idle, defer for DIFS, and wait for a further random backoff period.

To further prevent a station from occupying the channel continuously and thereby prevent other stations from accessing the channel, it may be required for a station wishing to transmit again after a transmission is completed to perform a random backoff. The random backoff is a procedure performed based on a so called Contention Window, wherein a random number of slots wherein the channel is to be found idle before transmission may take place is drawn from the range that may be specified by the Contention Window. This number may be counted down as long as the medium is found to be idle, and the counter may be frozen when the medium is found to be busy. When the count goes down to zero, transmission, e.g., of data, as shown in the Figure, may start. The Contention Window may be increased if previous transmissions are not received successfully by the intended recipient, or reset to a nominal value when previous transmissions are received successfully.

The Point Coordination Function Inter-frame Spacing (PIFS) may be used to gain priority access to the medium, and is shorter than the DIFS duration. Among other cases, it may be used by STAs operating under PCF, to transmit Beacon Frames with priority. At the nominal beginning of each Contention-Free Period (CFP), where access to the medium may be coordinated by a Point Coordinator (PC), the PC may sense the medium. When the medium is determined to be idle for one PIFS period, generally 25 μs, the PC may transmit a Beacon frame containing the Contention-Free (CF) Parameter Set element and a delivery traffic indication message element. The CF parameter set may carry parameters that may be needed to support PCF operation. A delivery traffic indication map may be understood as a traffic indication map which may inform the STAs about the presence of buffered multicast/broadcast data on the AP.

Load-based Clear Channel Assessment in Europe Regulation EN 301.893

For a device not utilizing the Wi-Fi protocol, EN 301.893, v. 1.7.1 provides the following requirements and minimum behavior for the load-based clear channel assessment. An example to illustrate the EN 301.893 is provided in FIG. 6.

1) Before a transmission or a burst of transmissions on an Operating Channel, the equipment may perform a Clear Channel Assessment (CCA) check using "energy detect", as represented in the Figure by a circled "1". The equipment may observe the Operating Channel(s) for the duration of the CCA observation time, which may be not less than 20 μs. The CCA observation time used by the equipment may be declared by the manufacturer. The Operating Channel may be considered occupied if the energy level in the channel exceeds the threshold corresponding to the power level given in point 5 below. If the equipment finds the channel to be clear", as represented in the Figure by a circled "1", it may transmit immediately,", as represented in the Figure by a circled "2", see point 3 below.

2) If the equipment finds an Operating Channel occupied, it may not transmit in that channel. The equipment may perform an Extended CCA check", as represented in the Figure by a circled "3", in which the Operating Channel is observed for the duration of a random factor N multiplied by the CCA observation time. N defines the number of clear idle slots resulting in a total Idle Period that may need to be observed before initiation of the transmission. The value of N may be randomly selected in the range 1 . . . q every time an Extended CCA may be required, and the value stored in a counter. The value of q is selected by the manufacturer in the range 4 . . . 32. This selected value may be declared by the manufacturer, see clause 5.3.1 q. The counter is decremented every time a CCA slot is considered to be "unoccupied". When the counter reaches zero, the equipment may transmit", as represented in the Figure by a circled "2", on the right side.

NOTE 2: The equipment is allowed to continue Short Control Signalling Transmissions on this channel providing it complies with the requirements in clause 4.9.2.3.

NOTE 3: For equipment having simultaneous transmissions on multiple, adjacent or non-adjacent, operating channels, the equipment is allowed to continue transmissions on other Operating Channels, providing the CCA check did not detect any signals on those channels.

3) The total time that an equipment makes use of an Operating Channel is the Maximum Channel Occupancy Time which may be less than $(13/32) \times q$ ms, with q as defined in point 2 above, after which the device may perform the Extended CCA described in point 2 above.

4) The equipment, upon correct reception of a packet which was intended for this equipment, can skip CCA and immediately, see note 4, proceed with the transmission of management and control frames (Ctrl), e.g. ACK and Block ACK frames", as represented in the Figure by a circled "4". A consecutive sequence of transmissions by the equipment, without it performing a new CCA, may not exceed the Maximum Channel Occupancy Time as defined in point 3 above.

NOTE 4: For the purpose of multi-cast, the ACK transmissions, associated with the same data packet, of the individual devices are allowed to take place in a sequence 5) The energy detection threshold for the CCA may be proportional to the maximum transmit power (PH) of the transmitter: for a 23 decibel-milliwatts (dBm) Effective Isotropic Radiated Power (e.i.r.p.) transmitter, the CCA threshold level (TL) may be equal or lower than −73 dBm/MHz at the input to the receiver, assuming a 0 decibel isotropic (dBi) receive antenna. For other transmit power levels, the CCA Threshold Level (TL) may be calculated using the formula: TL=−73 dBm/MHz+23−PH, assuming a 0 dBi receive antenna and PH specified in dBm e.i.r.p.

Licensed Assisted Access (LAA) to Unlicensed Spectrum Using LTE

Up to now, the spectrum used by LTE is dedicated to LTE. This has the advantage that an LTE system may not need to care about coexistence with other non-3GPP radio access technologies in the same spectrum and spectrum efficiency may be maximized. However, the spectrum allocated to LTE is limited, which cannot meet the ever increasing demand for larger throughput from applications/services. Therefore, a new study item has been initiated in 3GPP on extending LTE to exploit unlicensed spectrum in addition to licensed spectrum.

With Licensed-Assisted Access to unlicensed spectrum, as shown in FIG. 7, a UE may be connected to a PCell in the licensed band and one or more SCells in the unlicensed band. In this application a secondary cell in unlicensed spectrum may be denoted as LAA secondary cell (LAA SCell). The LAA SCell may operate in DL-only mode or operate with both UL and DL traffic. Furthermore, in future scenarios, the LTE nodes may operate in standalone mode in license-exempt channels without assistance from a licensed cell. Unlicensed spectrum may, by definition, be simultaneously used by multiple different technologies. Therefore, LAA as described above may need to consider coexistence with other systems such as IEEE 802.11 (Wi-Fi).

To coexist fairly with the Wi-Fi system, transmission on the SCell may conform to LBT protocols in order to avoid collisions and causing severe interference to on-going transmissions. This may include both performing LBT before commencing transmissions, and limiting the maximum duration of a single transmission burst. The maximum transmission burst duration may be specified by country and region-specific regulations, for e.g., 4 ms in Japan and 13 ms according to EN 301.893. An example in the context of LAA is shown in FIG. 8, with different examples for the duration of a transmission burst on the LAA SCell constrained by a maximum allowed transmission duration of 4 ms. FIG. 8 is a schematic diagram illustrating LAA to unlicensed spectrum using LTE carrier aggregation and listen-before-talk to ensure good coexistence with other unlicensed band technologies. In FIG. 8, the transmitted bursts are represented with black rectangles. Each rectangle represents a subframe. Note that before every transmitted burst in the SCell, a listening period is performed, as indicated by the striped areas. Bursts of 4 ms, 3 ms and 8 ms are represented in the Figures, as examples. Because in the example of FIG. 7, the maximum allowed transmission duration of 4 ms, the 8 ms burst is interrupted by a listening period after the first 4 ms of the burst.

Existing methods for LAA LTE to support LBT in unlicensed spectrum may comprise inappropriate delays of transmission, as well as interference problems, that result in poor performance of a wireless communications network.

SUMMARY

It is therefore an object of embodiments herein to improve the performance of a wireless communications network by providing improved methods of transmitting data and control and management information in a wireless communications network.

According to a first aspect of embodiments herein, the object is achieved by a method performed by a first radio node. The first radio node operates in an LTE wireless communications network. The first radio node selects an LBT method based on a type of information to be transmitted to a second radio node in a radio channel in unlicensed spectrum. The first radio node performs an LBT with the selected LBT method on the radio channel. When the type of information is data, the selected method comprises always deferring transmission of the data until one of the following: A) after completion of a first period of observation of the radio channel, an outcome of at least a second period of observation of the radio channel is that the radio channel is idle, and B) an outcome of a first period of observation of the radio channel and one or more defer periods is that the radio channel is idle. When the type of information is control or management information, the selected method comprises allowing transmission of the information immediately after an outcome of the first period of observation is that the radio channel is idle. A duration of the first period of observation provides priority to the control or management information compared to data.

According to a second aspect of embodiments herein, the object is achieved by a first radio node configured to operate in an LTE wireless communications network. The first radio node is further configured to select an LBT method based on a type of information to be transmitted to a second radio node in a radio channel in unlicensed spectrum. The first radio node is further configured to perform an LBT with the selected LBT method on the radio channel. When the type of information is data, the selected method comprises to always defer transmission of the data until one of the following: A) after completion of the first period of observation of the radio channel, the outcome of at least the second period of observation of the radio channel is that the radio channel is idle, and B) the outcome of the first period of observation of the radio channel and one or more defer periods is that the radio channel is idle. When the type of information is control or management information, the selected method comprises to allow transmission of the information immediately after the outcome of the first period of observation is that the radio channel is idle. A duration of the first period of observation is configured to provide priority to the control or management information compared to data.

According to a third aspect of embodiments herein, the object is achieved by a computer program, comprising instructions which, when executed on at least one processor, cause the at least one processor to carry out the method performed by the first radio node.

According to a fourth aspect of embodiments herein, the object is achieved by a computer-readable storage medium, having stored thereon the computer program, comprising instructions which, when executed on at least one processor, cause the at least one processor to carry out the method performed by the first radio node.

By performing LBT with the selected method based on the type of information to be transmitted, the first radio node may coexist fairly well with Wi-Fi, as well as with adjacent LAA LTE cells. First, by always deferring transmission of data, the first radio node decreases the changes of starvation of other nodes, and collision with transmissions from other nodes such as hybrid ARQ transmissions from WiFi nodes. Second, by allowing transmission of control and management information immediately after an outcome of the first period of observation is that the radio channel is idle, the first radio node prioritizes transmission of control and management information over data by using a duration of the first period of observation configured to provide priority to the control or management information compared to data. Hence, the performance of the wireless communications network is improved.

BRIEF DESCRIPTION OF THE DRAWINGS

Examples of embodiments herein are described in more detail with reference to the accompanying drawings, in which.

DETAILED DESCRIPTION

Terminologies

Figure 1:
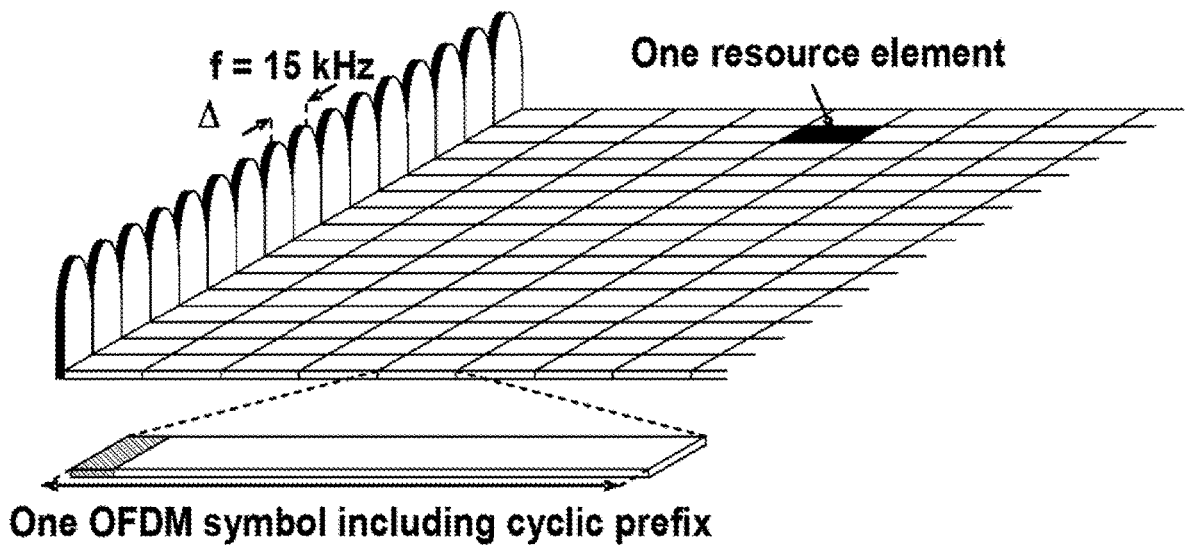
FIG. 1 is a schematic diagram illustrating the LTE downlink physical resource, according to existing methods.
Figure 2:
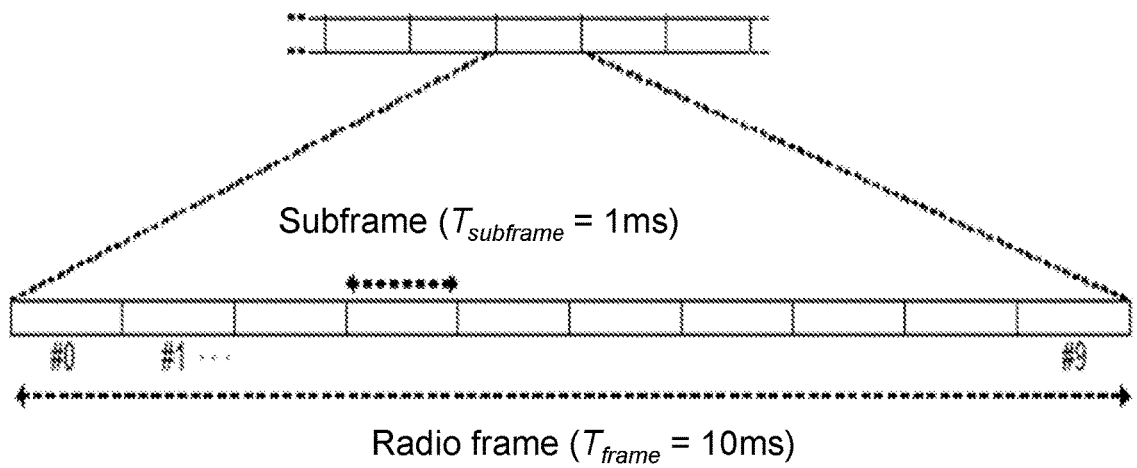
FIG. 2 is a schematic diagram illustrating an LTE time-domain structure, according to existing methods.
Figure 3:
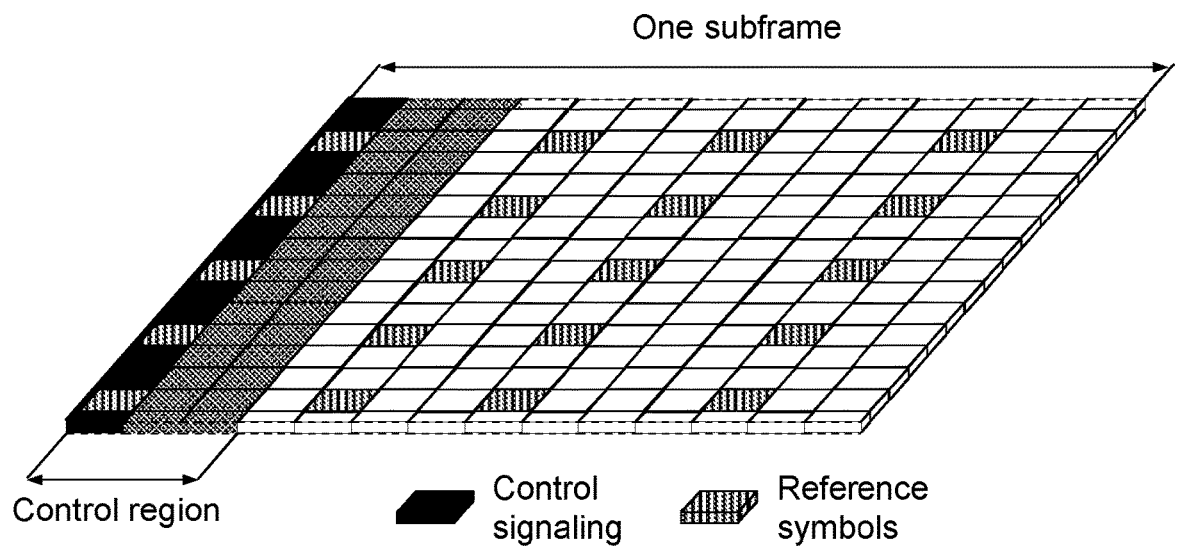
FIG. 3 is a schematic diagram illustrating a normal downlink subframe, according to existing methods.
Figure 4:
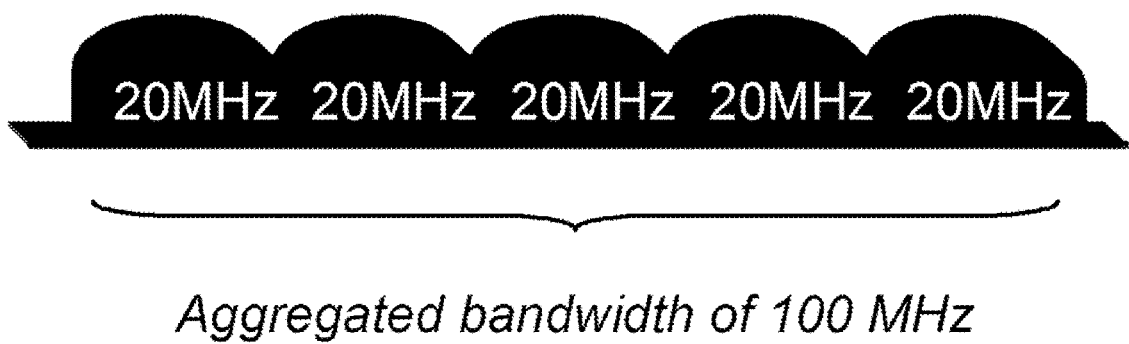
FIG. 4 is a schematic diagram illustrating carrier aggregation, according to existing methods.
Figure 5:
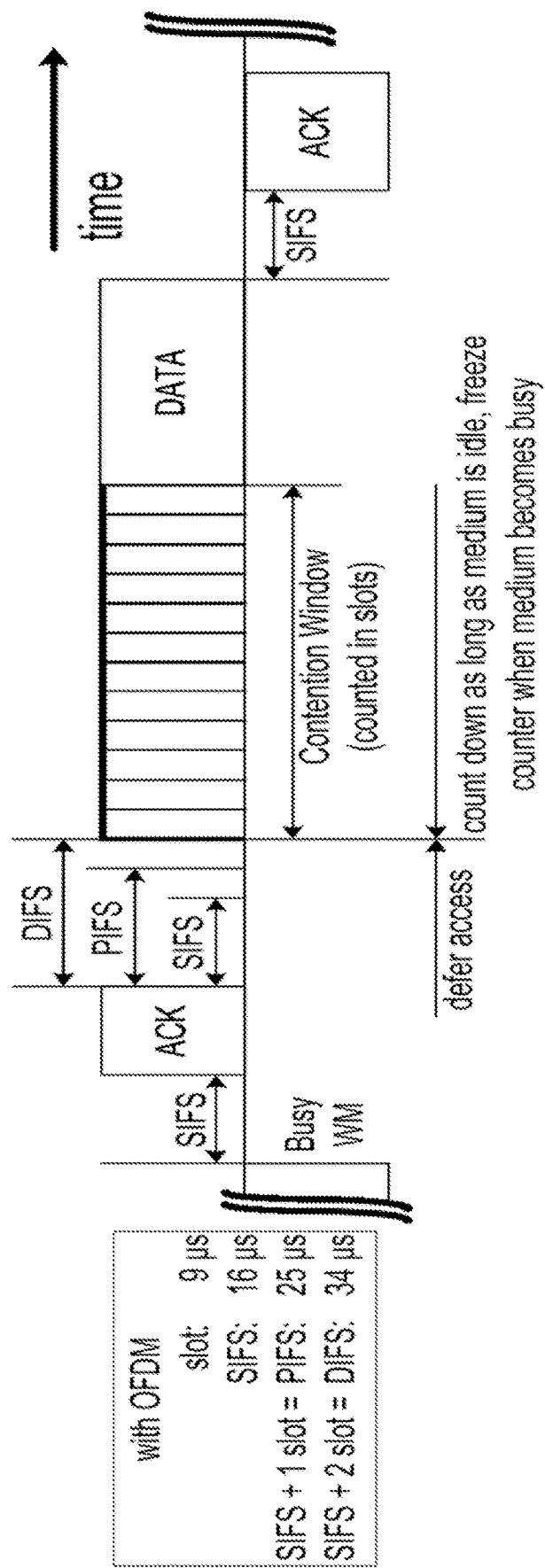
FIG. 5 is a schematic diagram illustrating of LBT in Wi-Fi, according to existing methods.
Figure 6:
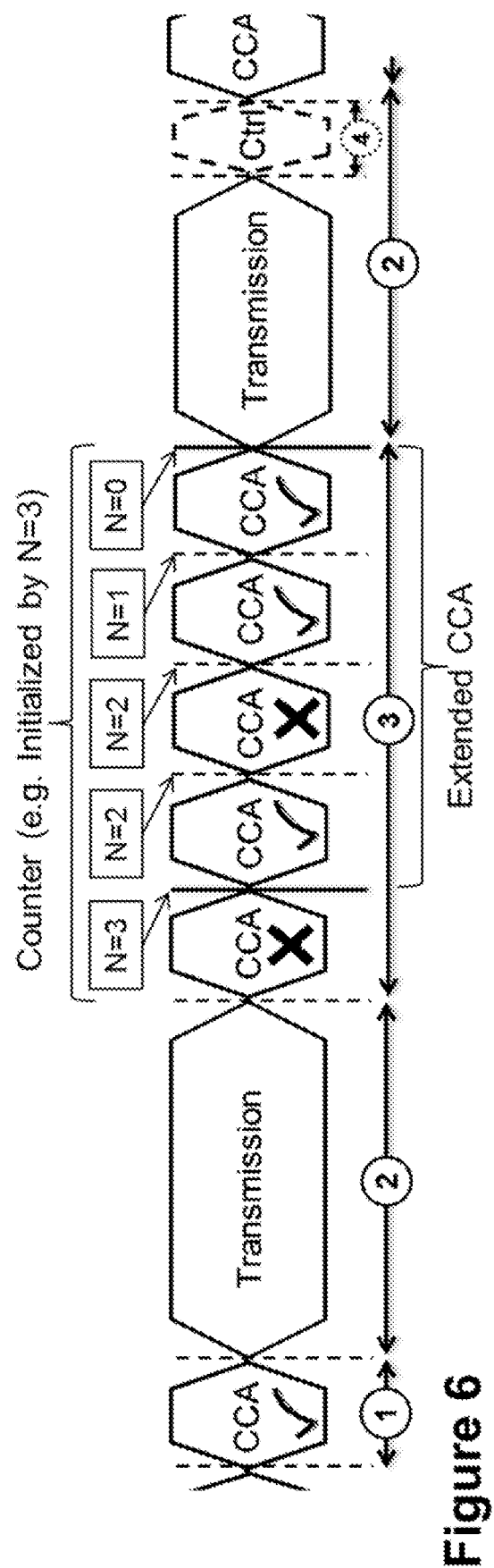
FIG. 6 is a schematic diagram illustrating of LBT in EN 301.893, according to existing methods.
Figure 7:
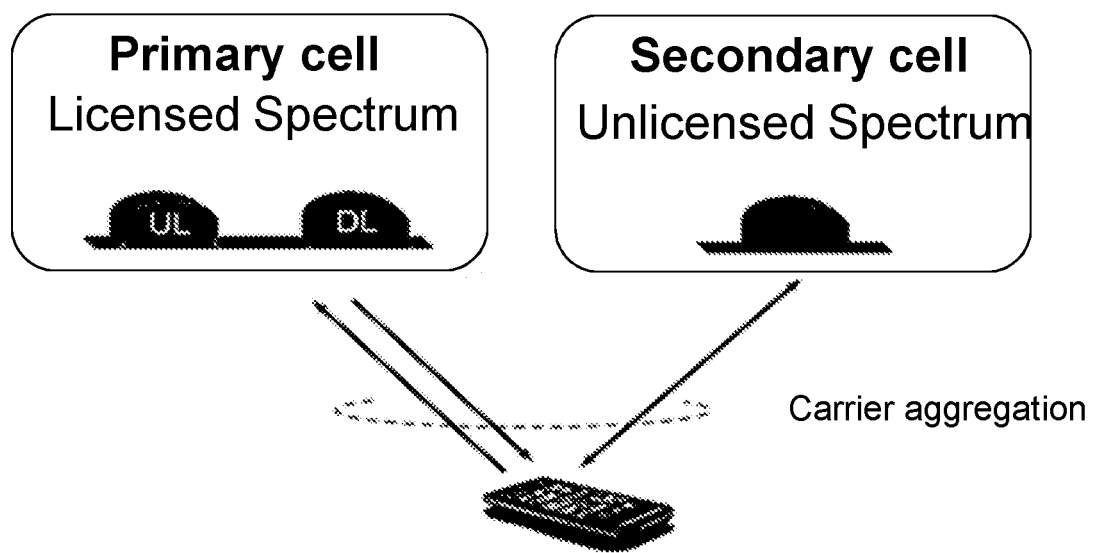
FIG. 7 is a schematic diagram illustrating a CA-capable UE configured with one LAA SCell, according to existing methods.
Figure 8:
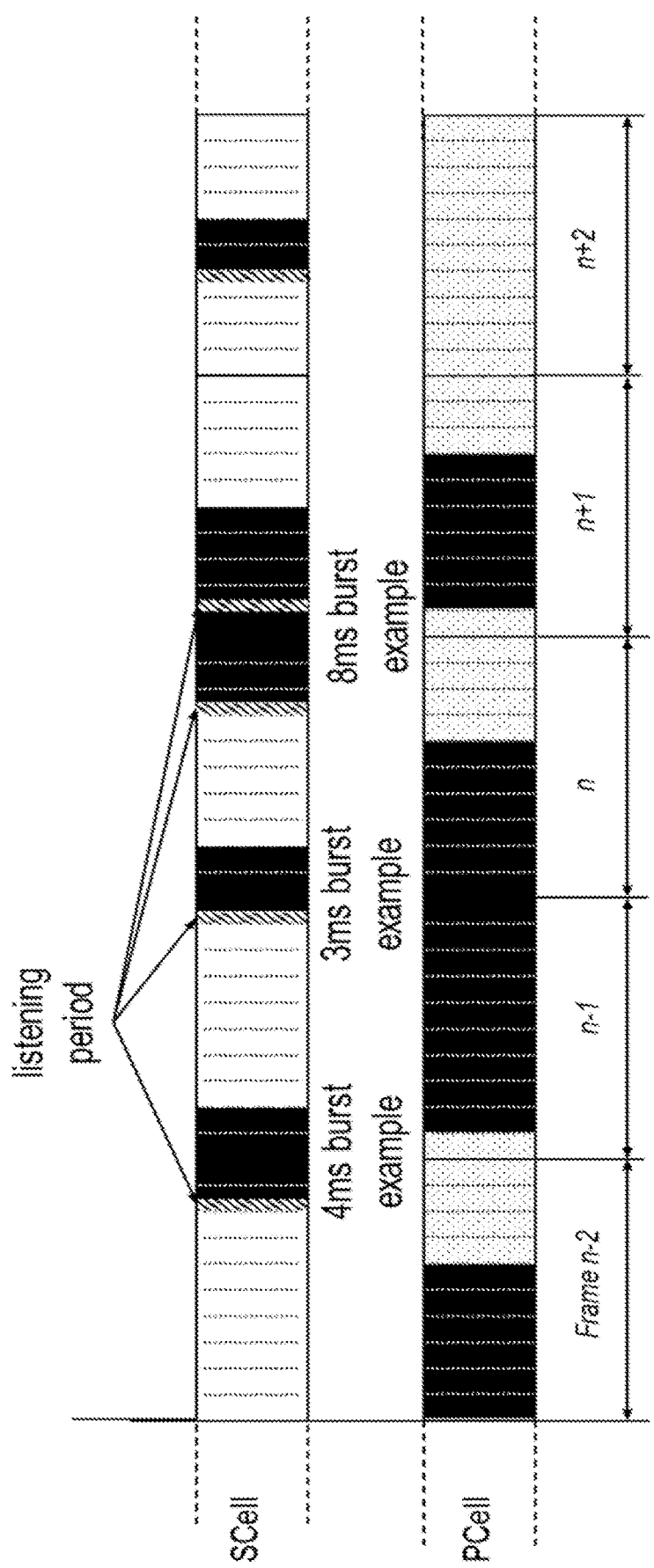
FIG. 8 is a schematic diagram illustrating LAA to unlicensed spectrum using LTE CA and LBT, according to existing methods.

The following commonly terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it can correspond to any type of radio network node or any network node, which communicates with at least a radio network node. Examples of network node are any radio network node stated above, core network node, e.g. MSC, MME etc., O&M, OSS, SON, positioning node, e.g. E-SMLC, MDT etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, PDA, iPAD, Tablet, mobile terminals, smart phone, laptop embedded equipped (LEE), laptop mounted equipment (LME), USB dongles etc.

The embodiments herein also apply to the multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the uplink, but the embodiments herein are equally applicable in the downlink.

As part of the development of embodiments herein, a number of problems associated with existing methods will first be identified and discussed.

There is currently no LBT specification for LTE, as it has operated exclusively in licensed spectrum so far. Reusing the existing LBT procedure for load-based equipment in the European EN 301.893 regulation may lead to LAA capturing the majority of the channel access opportunities and starvation of Wi-Fi devices, due to the lack of defer periods, shorter CCA durations compared to DIFS/PIFS, and several other differences from the Wi-Fi CSMA/CA channel contention procedure. Furthermore, it is not technically feasible for LAA LTE to exactly reuse the existing Wi-Fi CSMA/CA protocol.

FIG. 9 to FIG. 12 provide exemplary illustrations of some of the problems mentioned above.

Figure 9:
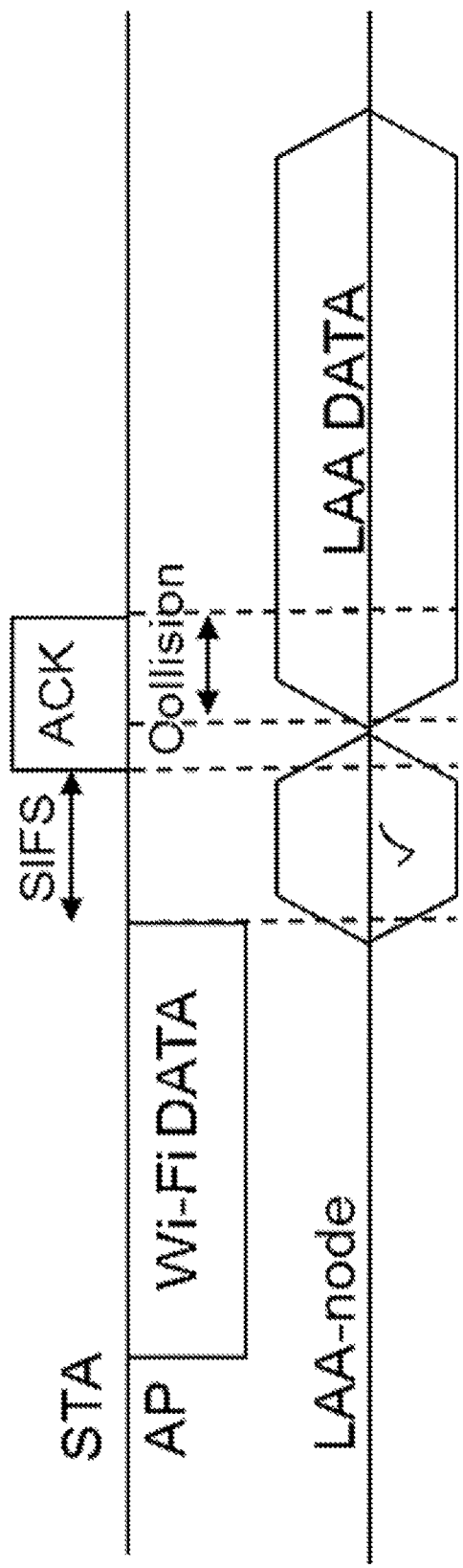
FIG. 9 is a schematic diagram illustrating LAA transmission collision with Wi-Fi ACK due to initial CCA and lack of defer period, according to existing methods.

In the first case, the EN 301.893 allows a node to transmit immediately after performing an initial CCA, which results in collision with a WiFi ACK frame. This is because, the energy that is measured inside the CCA period may only occur in a small portion of the CCA period thus resulting in an energy measurement that is insufficient to register as the channel being occupied. FIG. 9 illustrates an example of LAA transmission collision with Wi-Fi ACK due to initial CCA and lack of defer period. The Wi-Fi ACK is transmitted after the SIFS period by the STAtion (STA), following transmission of Wi-Fi Data by an Access Point (AP). Note most of the CCA occurs during the SIFS period, and the channel is therefore found to be idle.

Figure 10:
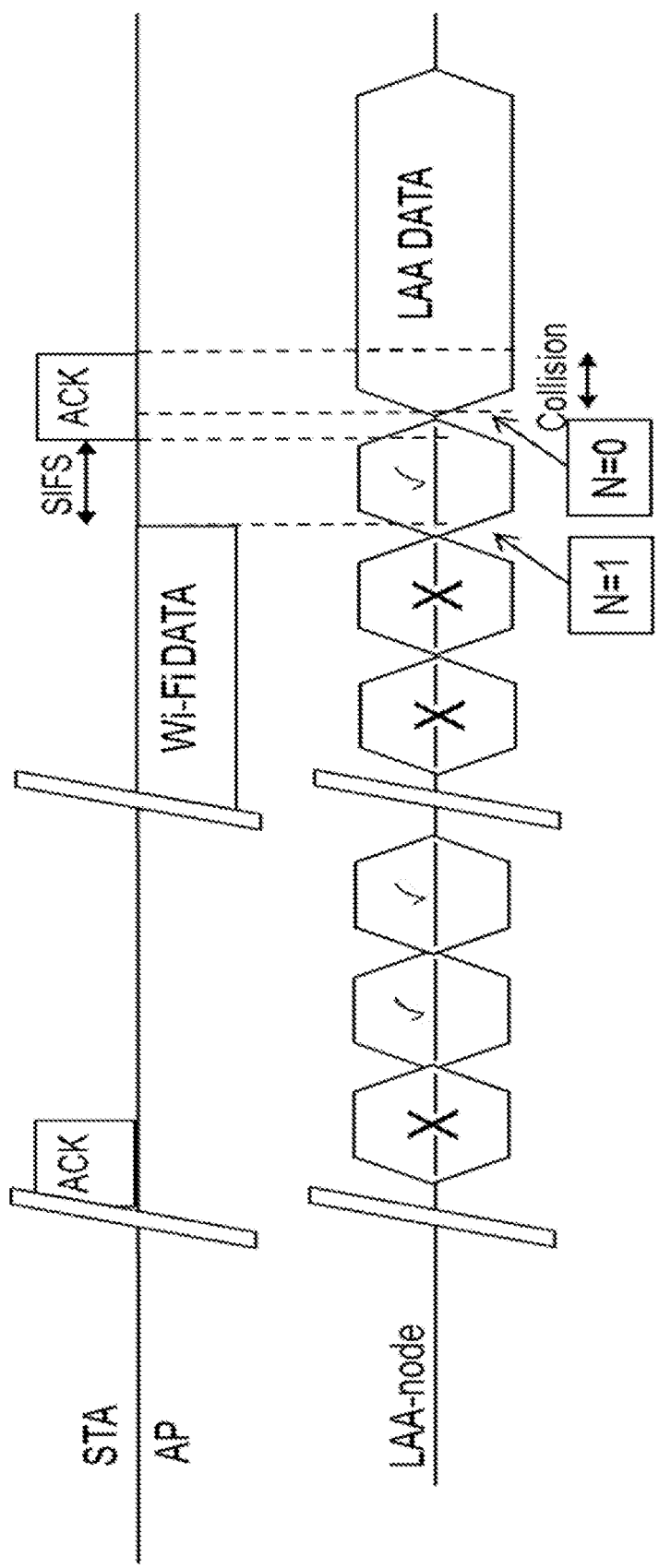
FIG. 10 is a schematic diagram illustrating LAA transmission collision with Wi-Fi ACK due to extended CCA and lack of defer period, according to existing methods.

In the second case, a node counting down to N=1 can similarly transmit after performing one CCA duration according to EN 301.893, which also results in collision with a WiFi ACK frame. FIG. 10 illustrates an example of LAA transmission collision with Wi-Fi ACK due to extended CCA and lack of defer period. The Wi-Fi ACK is transmitted after the SIFS period by the STA, following transmission of Wi-Fi Data by an Access Point (AP). Note most of the CCA occurs during the SIFS period, and the channel is therefore found to be idle.

Figure 11:
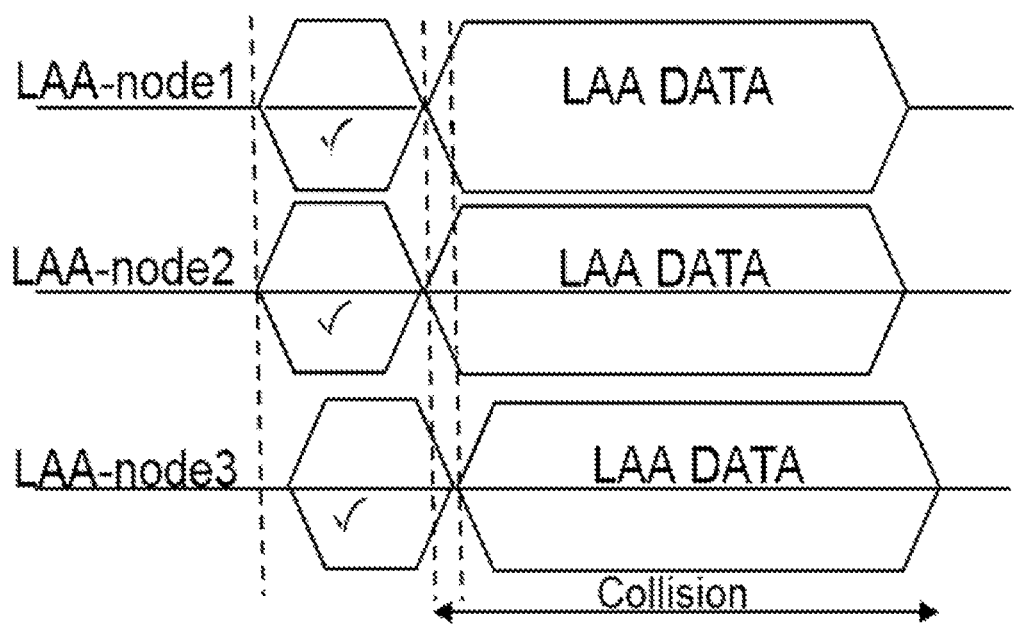
FIG. 11 is a schematic diagram illustrating collision among synchronized LAA nodes transmissions due to initial CCA and lack of post random back-off, according to existing methods.

In the third case, multiple nodes conform to EN 301.893 but with a slight inaccuracy in timing maintenance, resulting in the inability to achieve fair sharing of the channel because the nodes with a CCA boundary that occurs earlier may seize the channel before the other nodes. FIG. 11 illustrates an example of collision among synchronized LAA nodes transmissions due to initial CCA and lack of post random back-off. Two of the nodes, LAA-node1, LAA-node2, are synchronized, and the third node, LAA-node 3, is slightly delayed. The transmission of data from each of the nodes collides, after each of the nodes declares the channel to be idle.

Figure 12:
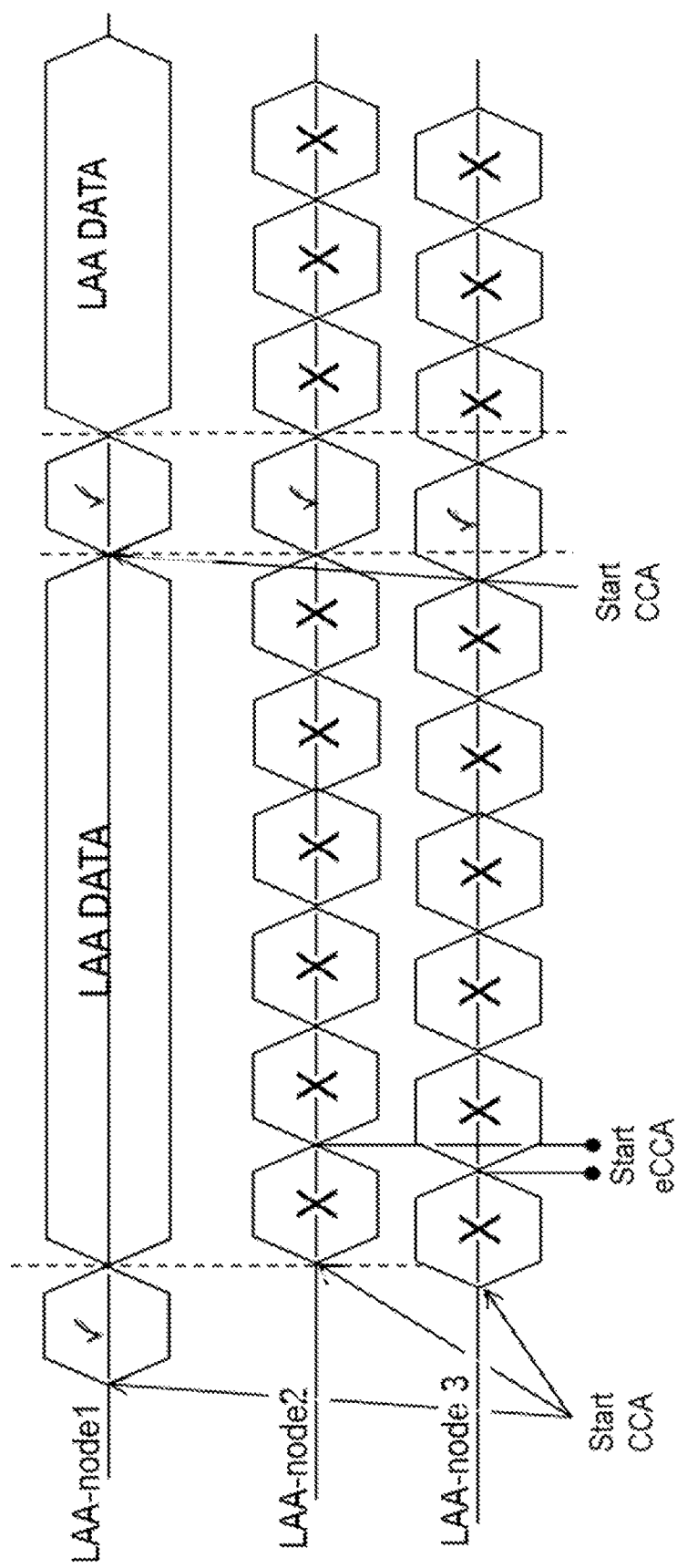
FIG. 12 is a schematic diagram illustrating starvation for some LAA nodes due to initial CCA and lack of post random back-off, according to existing methods.

In the fourth case, the lack of a backoff operation after the completion of a transmission results in the node that has just finished a transmission being more likely to recapture the channel than other nodes. FIG. 12 illustrates an example of starvation for some LAA nodes due to initial CCA and lack of post random back-off. LAA-node1 transmits data, performs an initial CCA, and after finding the channel to be idle, transmits a new set of data, preventing LAA-node2 and LAA-node 3 to transmit their data, even if the third node LAA-node 3 is slightly advanced and starts to perform the CCA earlier than LAA-node1, LAA-node2.

The problem of fair contention between LAA LTE and LAA LTE, and between LAA LTE and other technologies for channel access on an unlicensed carrier is addressed by embodiments herein, using the described embodiments, which may comprise an LBT protocol. Embodiments herein may define an LBT protocol for load-based systems operating in unlicensed bands. In particular, embodiments herein may be understood as focusing only on the LBT phase of a load-based OFDM system, and be designed to ensure fairer coexistence with other radio access technologies such as Wi-Fi while also satisfying EN 301.893 regulations. Embodiments herein may be understood to comprise an enhanced load-based clear channel assessment In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 13:
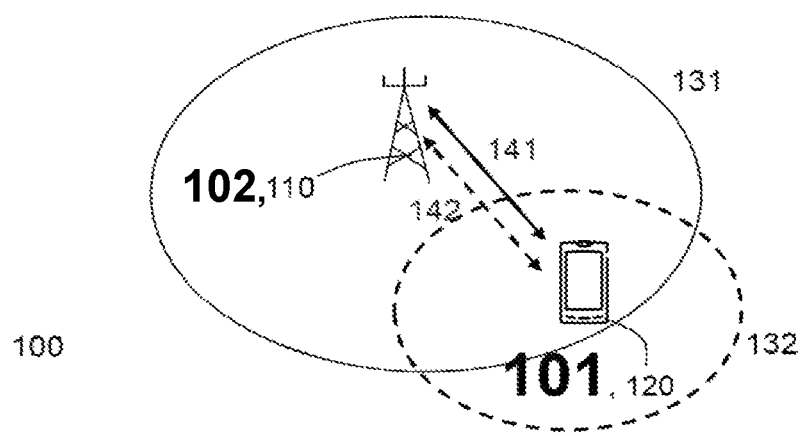
FIG. 13 is a schematic diagram illustrating embodiments of a wireless communications network, according to embodiments herein.

FIG. 13 depicts an example of a wireless communications network 100, sometimes also referred to as a cellular radio system, cellular network or wireless communications system, in which embodiments herein may be implemented. The wireless communications network 100 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, any 3rd Generation Partnership Project (3GPP) cellular network, 5G system or any cellular network or system comprising any combination with other Radio Access Technologies (RATs) such as e.g. Multi-Standard Radio (MSR) base stations, multi-RAT base stations etc. Thus, although terminology from 3GPP LTE may be used in this disclosure to exemplify embodiments herein, this should not be seen as limiting the scope of the embodiments herein to only the aforementioned system, but to a system that while having a different name, may have similar characteristics to that of LTE.

The wireless communications network 100 comprises a first radio node 101. The first radio node 101 may be a radio network node, such as a network node 110 described below, or a wireless device such as a wireless device 120 described below. In the non-limiting particular example illustrated in FIG. 13, the first radio node 101 is the wireless device 120.

The wireless communications network 100 comprises a plurality of network nodes whereof the network node 110 is depicted in FIG. 13. The network node 110 may be a transmission point such as a radio base station, for example an eNB, an eNodeB, or an Home Node B, an Home eNode B or any other network node capable to serve a wireless device, such as a user equipment or a machine type communication device in a wireless communications network.

The wireless communications network 100 covers a geographical area which is divided into cell areas, wherein each cell area is served by a network node, although, one network node may serve one or several cells. In the non-limiting example depicted in FIG. 13, the network node 110 serves a first cell 131 or primary cell 131. The primary cell 131 is typically in licensed spectrum. The network node 110 may also serve a second cell 132, licensed-assisted access cell 132, also referred to herein as licensed-assisted access secondary cell 132, as defined above. The licensed-assisted access cell 132 is in unlicensed spectrum. The primary cell 131 and the licensed-assisted access cell 132 may be used for communication between the network node 110 and wireless device 120. The network node 110 may be of different classes, such as, e.g., macro eNodeB, home eNodeB or pico base station, based on transmission power and thereby also cell size. Typically, wireless communications network 100 may comprise more cells similar to the first cell 131 and the second cell 132, served by their respective network node. This is not depicted in FIG. 13 for the sake of simplicity. The network node 110 may support one or several communication technologies, and its name may depend on the technology and terminology used. In 3GPP LTE, the network node 110, which may be referred to as eNodeBs or even eNBs, may be directly connected to one or more core networks.

The wireless device 120 also referred to herein as a user equipment or UE is located in the wireless communication network 100. The wireless device 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

The wireless devices 120 is configured to communicate within the wireless communications network 100 with the first network node 110 over a first radio link 141 in the primary cell 131, and over a second radio link 142 in the licensed-assisted access cell 132. The second radio link 142 may also be referred to herein as the radio channel 142. While not illustrated in the FIG. 13, the radio channel 142 or one of equivalent characteristics may also be established between the radio node 101, also referred to herein as first radio node 101 or first node 101 and another node, also referred to herein as second node or second radio node. For example, if the radio node 101 is the wireless device 120, the radio channel 142 may be established between the wireless device 120, and another wireless device in the wireless communications network 100. The second node or second radio node may also be a network node or wireless device, similar, respectively, to the network node 110 and the wireless device 120.

Embodiments of a method performed by the first radio node 101, will now be described with reference to the flowchart depicted depicted in FIG. 14. The first radio node 101 operates in an LTE wireless communications network 100.

The method may comprise the following actions, which actions may as well be carried out in another suitable order than that described below.

Action 1401

In order to address the problem of fair contention between LTE and WiFi, and between LTE and other technologies for channel access on an unlicensed carrier, the first radio node 101, according to embodiments herein, may perform LBT with some especially designed features, as will be explained in the next action. However, in order to, at the same time accommodate prioritization of certain information, the transmission of which may be adversely affected by such especially designed features, in this action, the first radio node 101 selects an LBT method based on a type of information to be transmitted to the second radio node 102 in the radio channel 142 in unlicensed spectrum. That is, the first radio node 101 may select the LBT method based on whether the type of information is data or is control or management information. The LBT method may comprise at least one of: one or more defer periods, utilization of a post-transmission random backoff, and always following a first period of observation of the radio channel 142, with a second period of observation of the radio channel 142.

The LBT method may comprise a first LBT method, which may be performed when the type of information is data, or a second LBT method, which may be performed when the type of information is control or management information.

When the type of information is data, the selected method comprises always deferring transmission of the data until one of: a) after completion of a first period of observation of the radio channel 142, an outcome of at least a second period of observation of the radio channel 142 is that the radio channel 142 is idle, and b) an outcome of a first period of observation of the radio channel 142 and one or more defer periods is that the radio channel 142 is idle. By either of these alternatives, the first radio node 101 may avoid collision with, e.g., a WiFi ACK/NACK, as was described in FIGS. 9 and 10, as well as with other transmissions, as described in FIG. 11.

Transmission of control or management information may need to be prioritized over data in order to ensure that control and management information that may be required by the second radio node 102 may be delivered to the second radio node 102 on a timely basis without delay. When the type of information is control or management information, the selected method comprises allowing transmission of the information immediately after an outcome of the first period of observation is that the radio channel 142 is idle, wherein a duration of the first period of observation provides priority to the control or management information compared to data. In order to provide priority compared to data transmissions, an example duration for the first period of observation may be $T_0=25$ μs. This may coincide with the PIFS duration of Wi-Fi beacon frames, so that both, Wi-Fi beacon and the LAA control information may have an equal probability of accessing the radio channel 142. Since the first period of observation may be an initial CCA, it may be understood that in some embodiments, a CCA duration may be set to be 25 μs.

In some embodiments, CCA durations may be set to be the same for all LAA LTE nodes in the wireless communications network 100.

In some embodiments, the selecting in this action 1401 may be further based on a carrier operation type. The carrier operation type may comprise multiple carrier operation. In some of these embodiments, the method may further comprise one of the following: a) applying a separate LBT procedure per carrier, and b) applying the selected method for data on a single carrier, wherein the single carrier is a master carrier, and on at least one other carrier, applying the selected method for control and management information. The at least one other carrier may be a slave carrier. The observation period may be a CCA, and the initial CCA duration on the slave carrier may be aligned with a last CCA duration of the master carrier.

In some embodiments, any of the LBT methods may comprise continuous monitoring of the radio channel 142. That is, whenever the radio channel 142 is found to be busy, the method may comprise continuous monitoring of the radio channel 142, by the first radio node 101, until the radio channel 142 is found to be idle.

Action 1402

In this action, the first radio node 101 performs an LBT with the selected LBT method on the radio channel 142 described above.

According to the foregoing, the selected LBT method by the first radio node 101 may comprise a first LBT method which may be performed when the type of information is data or it may comprise a second LBT method which may be performed when the type of information is control or management information.

In some embodiments, the first LBT method may comprise any of the actions 1501-1505 described below:

Action 1501

In this action, in order to keep track of the idle periods of observation, the first radio node 101 may set a counter to a first value. The first value may be for idle periods of observation of the radio channel 142. The radio channel 142 may be wherein data may be transmitted by the radio node 101. The idle periods of observation may be, for example, one or more CCAs.

In some embodiments, the counter may be derived from a common random seed, used to initialize a random number generator. The counter may therefore be referred to as a random backoff counter. The common random seed may be communicated to one or more wireless devices.

The random seed may be given by bit field or Cyclic Redundancy Check (CRC) scrambling of an explicit DCI message field. In addition, the random seed may also be derived by the subframe, slot and/or radio frame number, in combination with other parameters such as PCID, operating frequency etc. In yet another example, the random seed may be preconfigured to the UE by Radio Resource Control (RRC) or by a parameter signaled by a control message field. The control message field may be a bit field included in Discovery Reference Signal (DRS) transmission duration or separately broadcasted at given occasions.

Action 1502

To decrease the possibility of, or to prevent a collision with e.g., transmission of a Wi-Fi ACK, as explained in FIGS. 9 and 10, in this action, the first radio node 101, after completion of a first period of observation of the radio channel 142, may always defer transmission of the data until an outcome of at least a second period of observation of the radio channel 142 is that the radio channel 142 is idle. This may be understood as applying a defer period, e.g., waiting for the medium to remain idle for an extra period of time.

The first period of observation may be an initial CCA. The second period of observation may be part of an extended period of observation or extended CCA stage. Each of the periods of observation may have a duration of 20 μs.

Action 1503

With respect to the counter set in Action 1501, and in accordance with the performance of Action 1502, in this action, the first radio node 101 may decrement the first value by one, only after an outcome of one of: a) the first period of observation, and b) one of the at least one second period of observation of the radio channel 142, is that the radio channel 142 is idle.

The first value may remain unchanged after the outcome of one of: a) the first period of observation, and b) the one of the at least second period of observation of the radio channel 142 is that the radio channel 142 is busy.

Action 1504

In this action, the first radio node 101 may transmit the data in the radio channel 142 after the outcome of the at least second period of observation of the radio channel 142 is that the radio channel 142 is idle. The transmission of the data may be done to another node, or second node. The other node, other radio node or second node may be any of the first wireless device 120 or the network node 110, or another wireless device or network node in the wireless communications network 100 with which the radio node 101 keeps a radio channel of similar characteristics to that of the radio channel 142.

In some embodiments, the first radio node 101 may transmit the data after the counter reaches a threshold, that is, a certain number of periods of observation of the radio channel 142, wherein the radio channel 142 is found to be idle.

Action 1505

To decrease the possibility of, or to prevent that the first radio node 101 repeatedly seizes the radio channel 142 and starves other radio nodes, as explained in FIGS. 11 and 12, in this action, the first radio node 101, after transmitting the data, may set the counter to a second value. This may be understood as that the first radio node 101 may restart the timer. After the setting the counter to the second value, the deferring 1502 and the transmitting 1504 may be performed for a new set of data. The second value may be derived in a random fashion, in which case action 1505 may be referred to as a post transmission random backoff.

The LBT protocol in embodiments herein may be applicable to both LAA LTE and standalone LTE operation in license-exempt channels.

The following advantages have been identified for embodiments herein:

First, since starvation of other nodes and collision with Wi-Fi ACK-NACKS is diminished or prevented, LAA LTE may coexist fairly well with Wi-Fi, as well as with adjacent LAA LTE cells. Similarly, standalone LTE in license-exempt channels may coexist fairly well with Wi-Fi, as well as with adjacent LTE cells employing LBT.

Second, LTE management and control information transmissions are provided priority over LTE data transmissions by selection of the LBT method.

Third, Wi-Fi beacon transmissions are allowed a greater priority in accessing the channel by LAA compared to LAA data transmissions by the duration of the first observation period coinciding with the PIFS duration of Wi-Fi beacon frames.

A further description of the proposed LBT protocol for load-based equipment, according to embodiments herein, follows, providing specific examples in FIGS. 16-25 of selected methods by the first radio node 101 according to Action 1401, which are then performed in Action 1402. This is generally applicable for both DL and UL transmissions, for both FDD and TDD systems. For the case of LBT by UEs prior to UL transmissions, the extended backoff counter for one or more UEs may be derived from a common random seed, which for example may be communicated to said one or more UEs, as described earlier. As stated earlier, the LBT protocol in embodiments herein may be applicable to both LAA LTE and standalone LTE operation in license-exempt channels.

In the following description, the radio channel 142 may be referred to as "the channel", and the wireless communications network 100 may be referred to as "the network".

FIGS. 16-21, which are described below, provide different examples of embodiments herein. Each of FIGS. 16-21 represent different variations on when the backoff counter may be decremented, which may then determine how soon the first radio node 101 may transmit.

LBT Procedure for Data Transmissions

Embodiments herein may first address LBT for data transmissions that may be carried for example on the PDSCH or PUSCH. The principle may be understood as to always perform an initial CCA of duration $T_0$; if the channel, e.g., the radio channel 142, is unoccupied during the initial CCA, then an extended CCA procedure for N CCA durations of $T_1$ each may be performed, as described earlier in relation to Action 1401 and Action 1502. The extended CCA phase may be understood as being equivalent to a random backoff stage. As a non-limiting example, both initial and extended CCA durations may be the same value, such as $T_0 = T_1 = 20$ μs. In other cases, the initial and extended CCA durations may be different, such as $T_0=23$ µs and $T_1=20$ µs. The CCA durations may be set to be the same for all LAA LTE nodes in the network.

The number of extended CCAs or backoff counter N may be drawn randomly between 1 and q at the start of the random backoff process, in accordance to Action 1501. As a non-limiting example, N may be drawn uniformly between 1 and q, while in other examples, different probabilities may be used for different values within the support of N.

Figure 16:
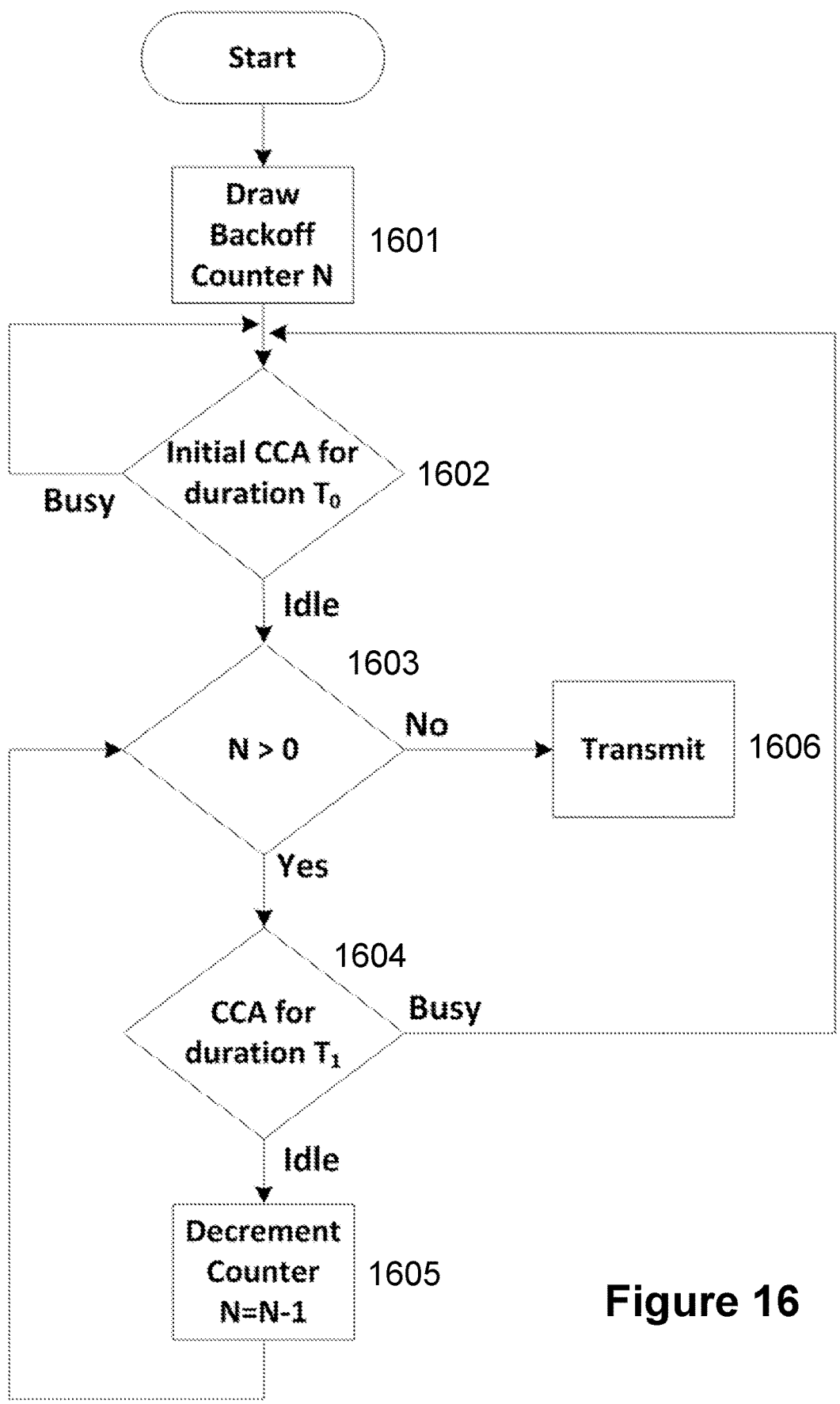
FIG. 16 is a flowchart illustrating a first example of LBT for data transmissions v1, according to embodiments herein.
Figure 17:
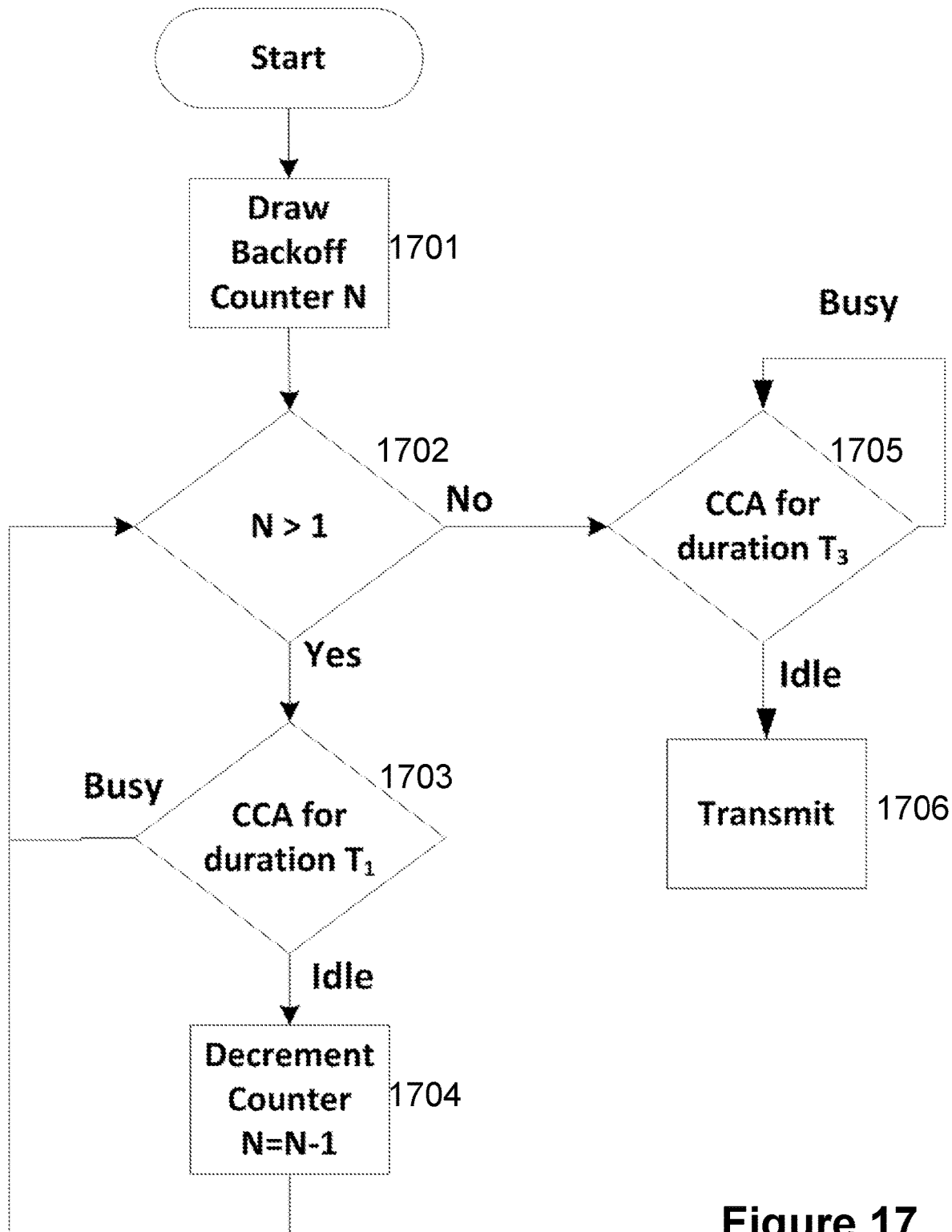
FIG. 17 is a flowchart illustrating a first example of LBT for data transmissions v2, according to embodiments herein.

The first example for LBT before data transmissions is illustrated in the flowchart of FIG. 16. This first example is performed according to Action 1401 (A), whereby when the type of information is data, the selected method comprises always deferring transmission of the data until after completion of a first period of observation of the radio channel 142, an outcome of at least a second period of observation of the radio channel 142 is that the radio channel 142 is idle. As shown in the Figure, at 1601, and according to Action 1501, a backoff counter N is drawn. At 1602, if the initial CCA deems the channel to be busy, it is then repeated. When the channel is deemed to be idle, at 1603, it is checked if N>0. If N is larger than 0, an extended CCA for a duration $T_1$ is performed, in accordance with Action 1502. At 1604, for each extended CCA duration where the channel is deemed to be unoccupied, the backoff counter N is decremented by 1 at 1605, in agreement with Action 1503. If the channel is determined to be busy during an extended CCA, the backoff counter is frozen and the LBT process reverts to the initial CCA step. At 1606, the data transmission may be performed immediately after the backoff counter value reaches zero, i.e., after N extended CCAs showing Idle channel state have been obtained, in agreement with Action 1504. As an example for the minimum possible delay before transmission according to Action 1502, if $T_0=T_1=20$ µs, N=1, and both the initial CCA and single extended CCA show the channel to be Idle, the data may be transmitted 40 µs after commencing LBT in this embodiment.

In a second version of the example, the countdown procedure may be changed so that the counter is counted down for every free CCA occasion compared to the first version, wherein the initial CCA duration does not result in decrementing the counter. This second example is performed according to Action 1401 (B), whereby when the type of information is data, the selected method comprises always deferring transmission of the data until an outcome of a first period of observation of the radio channel 142 and one or more defer periods is that the radio channel 142 is idle. To then support that the last CCA duration may need to result in a longer CCA duration time, this last procedure may be moved out from the countdown procedure. The flow chart for this example is captured in FIG. 17. In one implementation, the longer CCA duration $T_3$ may be set to $2 \times T_1$. In a second implementation, the longer CCA duration $T_3$ may be set to $T_0+T_1$. At 1701, and according to Action 1501, a backoff counter N is drawn. At 1702, it is checked if N>1. If N is larger than 1, a CCA for a duration $T_1$ is performed at 1703. At 1704, the counter is counted down for every free CCA occasion. In the previous examples in FIGS. 16 and 17, if the channel is found to be occupied during the extended CCA phase, then the user may have to observe a clear channel of combined duration $T_0+T_1$ before it may resume counting down. If the channel transitions from busy to being idle somewhere in between the CCA period, the LAA user still waits until the end of the CCA period upon detecting a busy channel, and then starts a new round of two CCAs in the random backoff stage. Therefore, during this defer period, if the original transmission that was sensed and caused the LAA user to defer is a very short transmission, such as Wi-Fi transmission of 4 µs or 8 µs, that coincides with the start of LAA CCA of time $T_1$, it may be followed by a transmission from another Wi-Fi user that also deferred but still counted down and captured the channel within this duration $T_0+2T_1$. In contrast, in the Wi-Fi Distributed Coordination Function (DCF) procedure, the STAs continuously monitor the channel when they defer during random backoff, and may start counting down precisely after the end of an on-going transmission after waiting for a DIFS period. When there is one CCA left, N=1, at 1702, it is performed with a longer duration $T_3$. Transmission of data may then begin at 1706.

Figure 18:
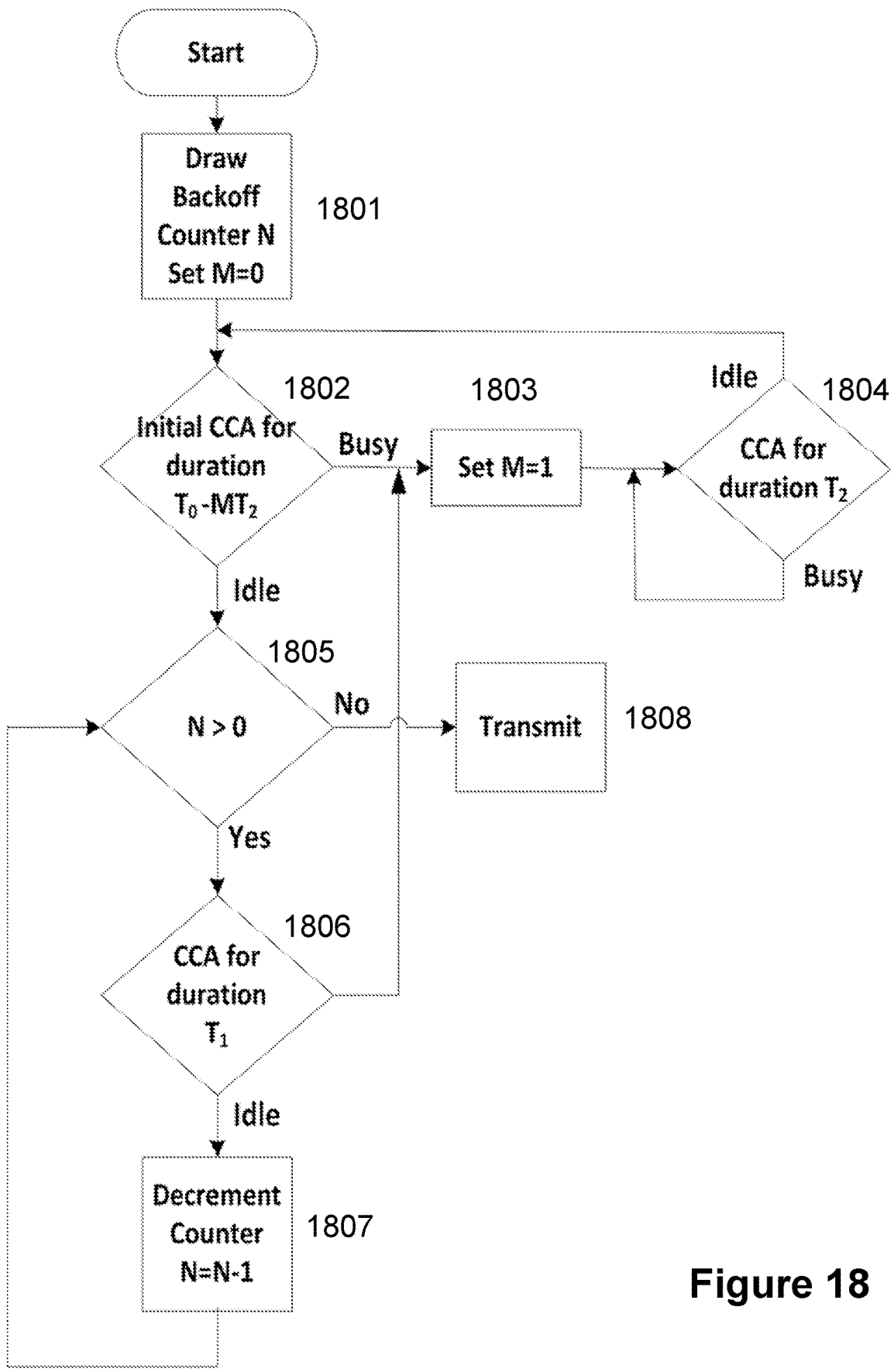
FIG. 18 is a flowchart illustrating a second example alternative of LBT for data transmissions v1, according to embodiments herein.

Therefore, another example for data LBT is shown in the flowchart of FIG. 18. The example of FIG. 18 is performed according to Action 1401 (A), whereby when the type of information is data, the selected method comprises always deferring transmission of the data until after completion of a first period of observation of the radio channel 142, an outcome of at least a second period of observation of the radio channel 142 is that the radio channel 142 is idle. At 1801, and according to Action 1501, a backoff counter N is drawn. A value M for determining whether to use a shorter observation period after the channel is found to be busy is set to 0. Where at 1802, if the channel is found to be busy during the random backoff phase, M is set to 1 at 1803, and the channel is monitored continuously for time slots of duration $T_2$ at 1803 until one such time slot is clear, followed by an initial CCA of duration $T_0-T_2$ in accordance with Action 1502. If at 1805 N>0, a CCA for duration $T_1$ is performed, and this is followed by resumption of counting down at 1807 if this CCA declares Idle. It may be desirable to have $T_2 \ll T_1$ in order to quickly determine the exact stopping time of the on-going transmission during the random backoff stage. In this case, an example value of the nominal extended CCA duration can be $T_1=20$ µs, as well as $T_0=20$ µs for the initial CCA and $T_2=4$ µs. In a different implementation of the example, M may be always set 0 so that the CCA duration may always correspond to $T_1$. When N is no longer larger than 0, data transmission is performed at 1808 in accordance with Action 1504.

Figure 19:
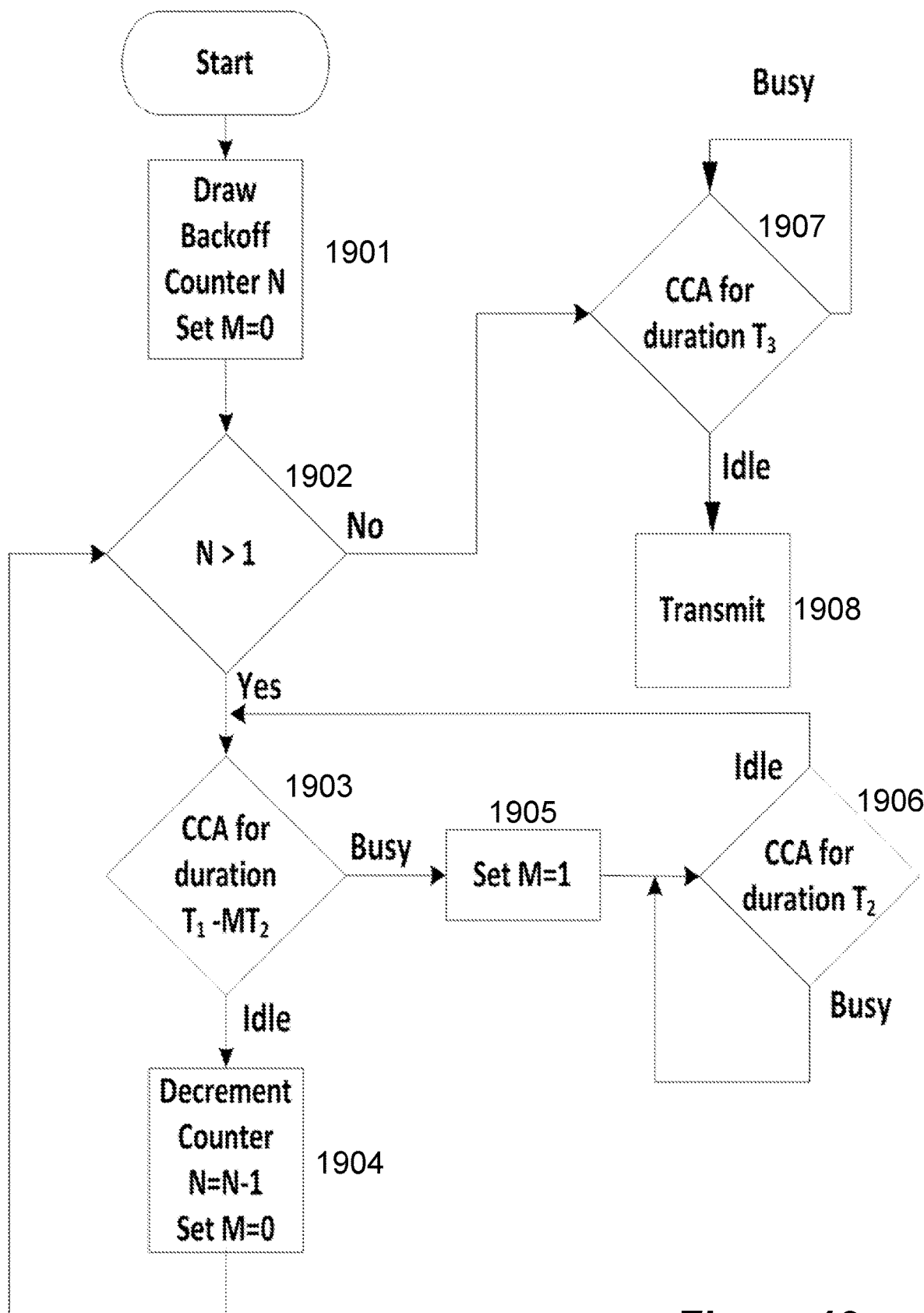
FIG. 19 is a flowchart illustrating a second example of LBT for data transmissions v2, according to embodiments herein.

In a second version of the example, the initial CCA duration is excluded from the design as shown in the flowchart of FIG. 19. At 1901, and according to Action 1501, a backoff counter N is drawn. A value M for determining whether to use a shorter observation period after the channel is found to be busy is set to 0. If at 1902 N>1, a CCA for a duration of $T_1-MT_2$ is performed at 1903, and this is followed by a count down at 1904 if this CCA declares Idle. Where the channel is found to be busy during the random backoff phase, M is set to 1 at 1905, and the channel is monitored continuously for time slots of duration $T_2$ at 1906 until one such time slot is clear, followed by al CCA of duration $T_1-MT_2$ in accordance with Action 1502. When N is no longer larger than 1, a CCA for duration $T_3$ is performed at 1907, and this is followed by transmission of the data at 1908 when the channel is found to be idle. It is further possible to exclude the CCA duration $T_2$ from the CCA duration for $T_1$, i.e. M=0 always. That is, if M is always 0, then the box 1905 with "Set M=1" may be removed from the Figure. Then the LBT process may be less aggressive in terms of channel observation and resumption of countdown after this change. This is however not shown in the figures below.

In yet another example, it may be possible to combine the two above examples into a single example, wherein there may be a short listening interval if the channel is found to be busy with the addition that in order for the channel to be found to be free, two consecutive CCA durations may need to be Idle. An example of such a method is found in the flowchart of FIG. 20. At 2001, and according to Action 1501, a backoff counter N is drawn. Another value M for determining whether to use a shorter observation period after the channel is found to be busy is set to 0. At 2002, if the initial CCA deems the channel to be busy, it is then repeated. When the channel is deemed to be idle, at 2003, it is checked if N>1. If N is larger than 1, an extended CCA for a duration $T_1-MT_2$ is performed at 2004, in accordance with Action 1502, and this is followed by a count down at 2005 if this CCA declares Idle, and M is set to 0. Where the channel is found to be busy during the random backoff phase, M is set to 1 at 2006, and the channel is monitored continuously for time slots of duration $T_2$ at 2007 until one such time slot is clear, followed by a CCA of duration $T_1-MT_2$ in accordance with Action 1502.

When N is no longer larger than 1, a CCA for duration $T_3-MT_2$ is performed at 2008, M is set to 1 at 2009, and this is followed by a CCA for a duration of $T_2$ at 2010. After this, a new CCA of duration $T_1-MT_2$ is performed. Transmission of the data, in accordance with 1504 is performed at 2011 when the outcome of this CCA is that the channel is idle.

transmission of the data at 1908 when the channel is found to be idle.

Figure 20:
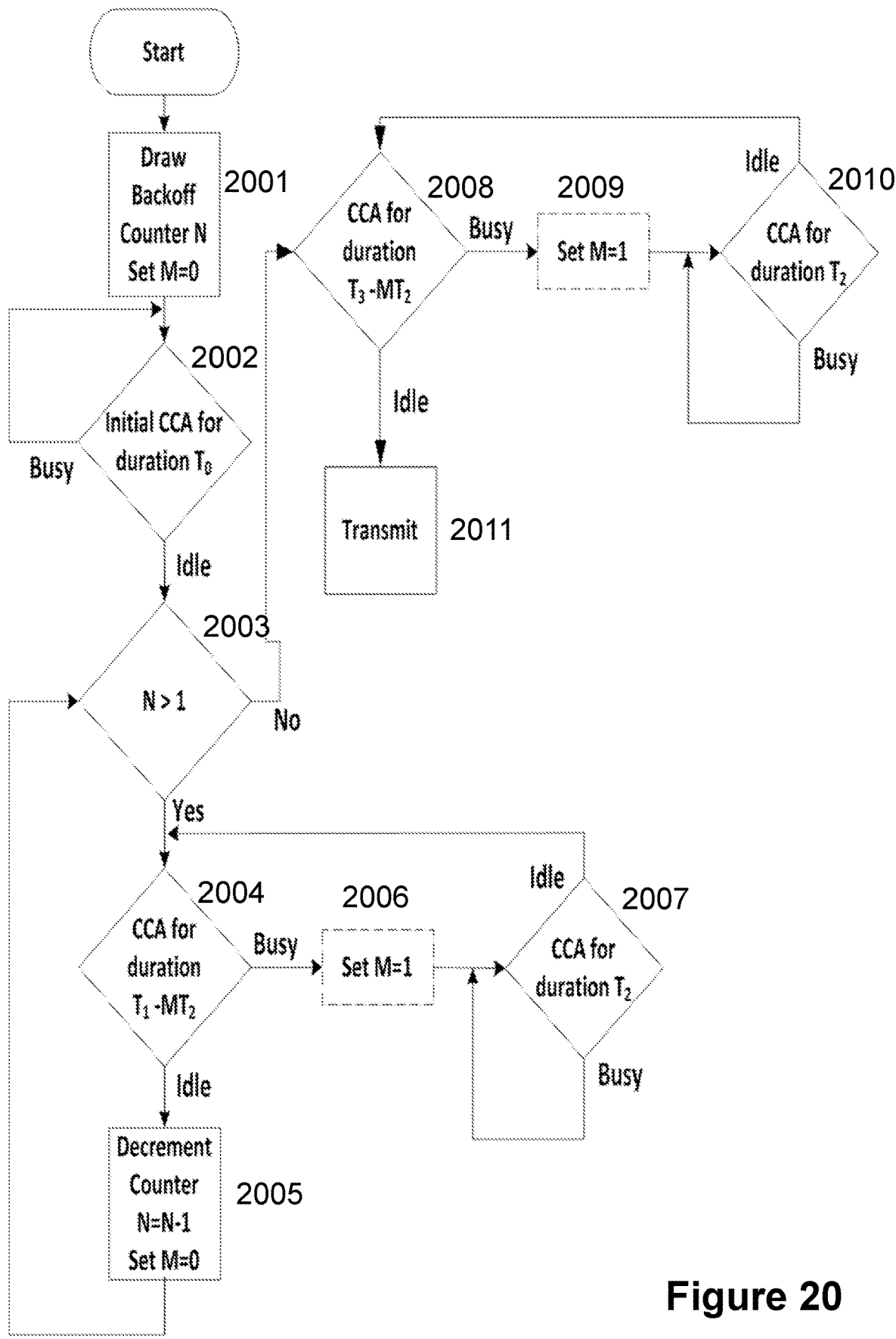
FIG. 20 is a flowchart illustrating a third example of LBT for data transmissions v1, according to embodiments herein.
Figure 21:
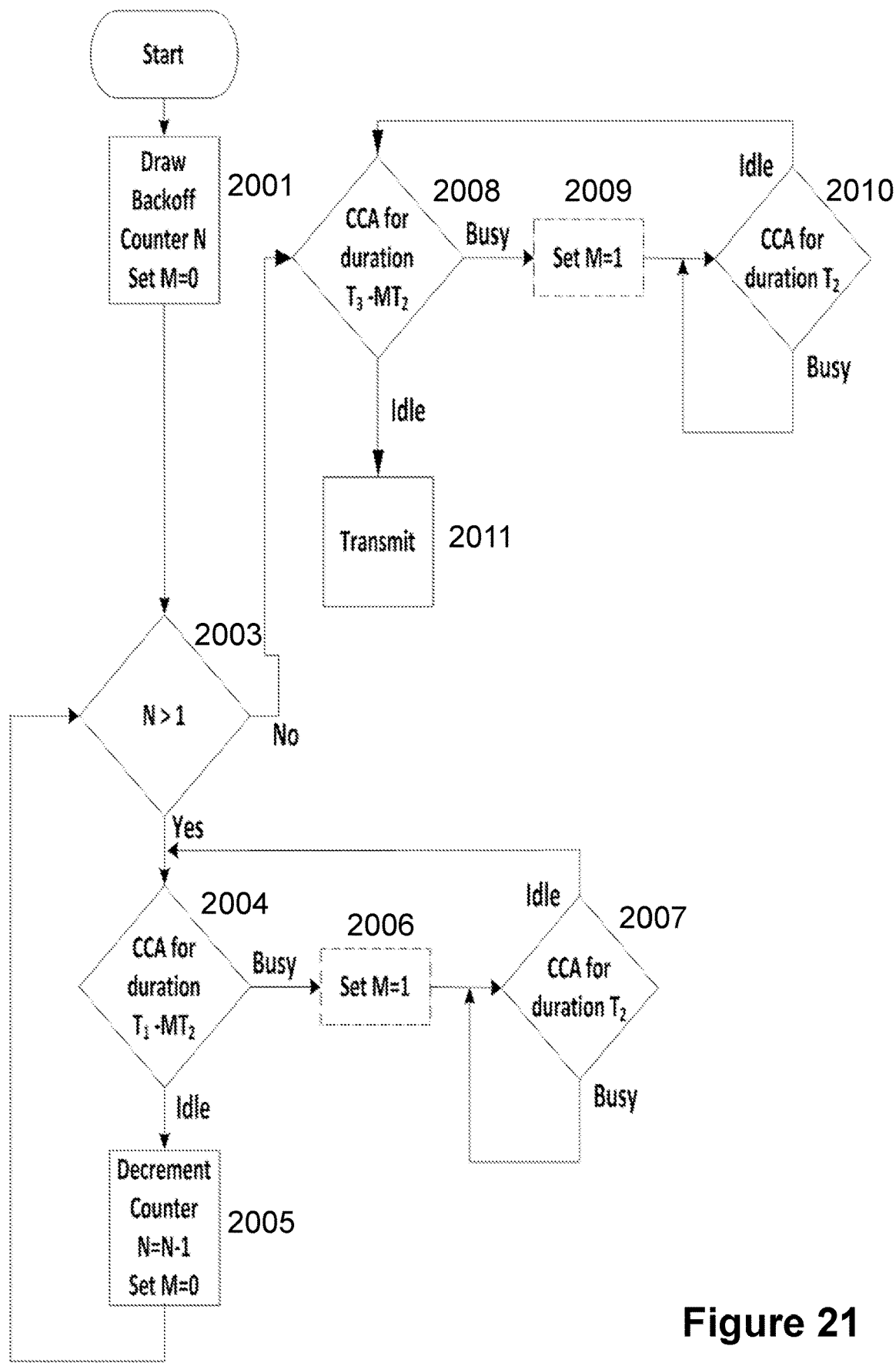
FIG. 21 is a flowchart illustrating a third example of LBT for data transmissions v2, according to embodiments herein.

In addition, it may be further possible to implement the example of FIG. 20 without an initial CCA occasion, that is, without Action 2002, which is shown in the example of FIG. 21. An equivalent description for Actions 2001 and 2003-2011 to that provided in FIG. 20 applies to FIG. 21, but will not be repeated here. In addition to the above, it may be further possible to disregard the time for the CCA duration $T_2$ in the CCA duration involving $T_1$. This would correspond to always setting M=0. This is however not shown in the FIGS. 20 and 21.

LBT Procedure for Management and Control Information

Figure 22:
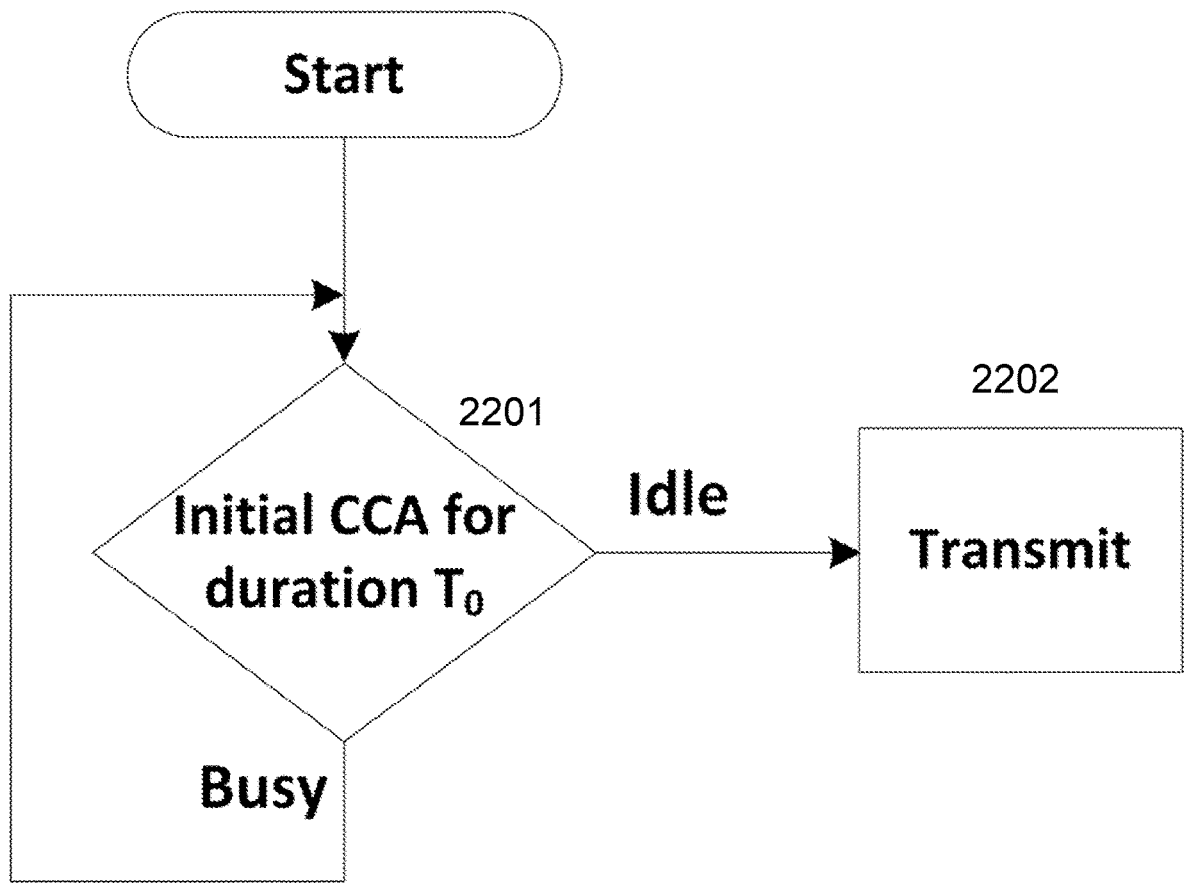
FIG. 22 is a flowchart illustrating a first example of LBT for management and control information, according to embodiments herein.

The LBT procedure for management and control information according to Actions 1401 and 1042 is shown in FIG. 22. When the type of information is control or management information, the selected method comprises immediately after an outcome of the first period of observation at 2201 is that the radio channel 142 is idle, allowing transmission of the information at 2202. A non-limiting example of management and control information is DRS transmission. In order to provide priority compared to data transmissions, an example duration for the initial CCA may be $T_0=25$ μs. This may coincide with the PIFS duration of Wi-Fi beacon frames, such that both the management and control information and the Wi-Fi beacon frames may have equal likelihood of accessing the radio channel 142.

Figure 23:
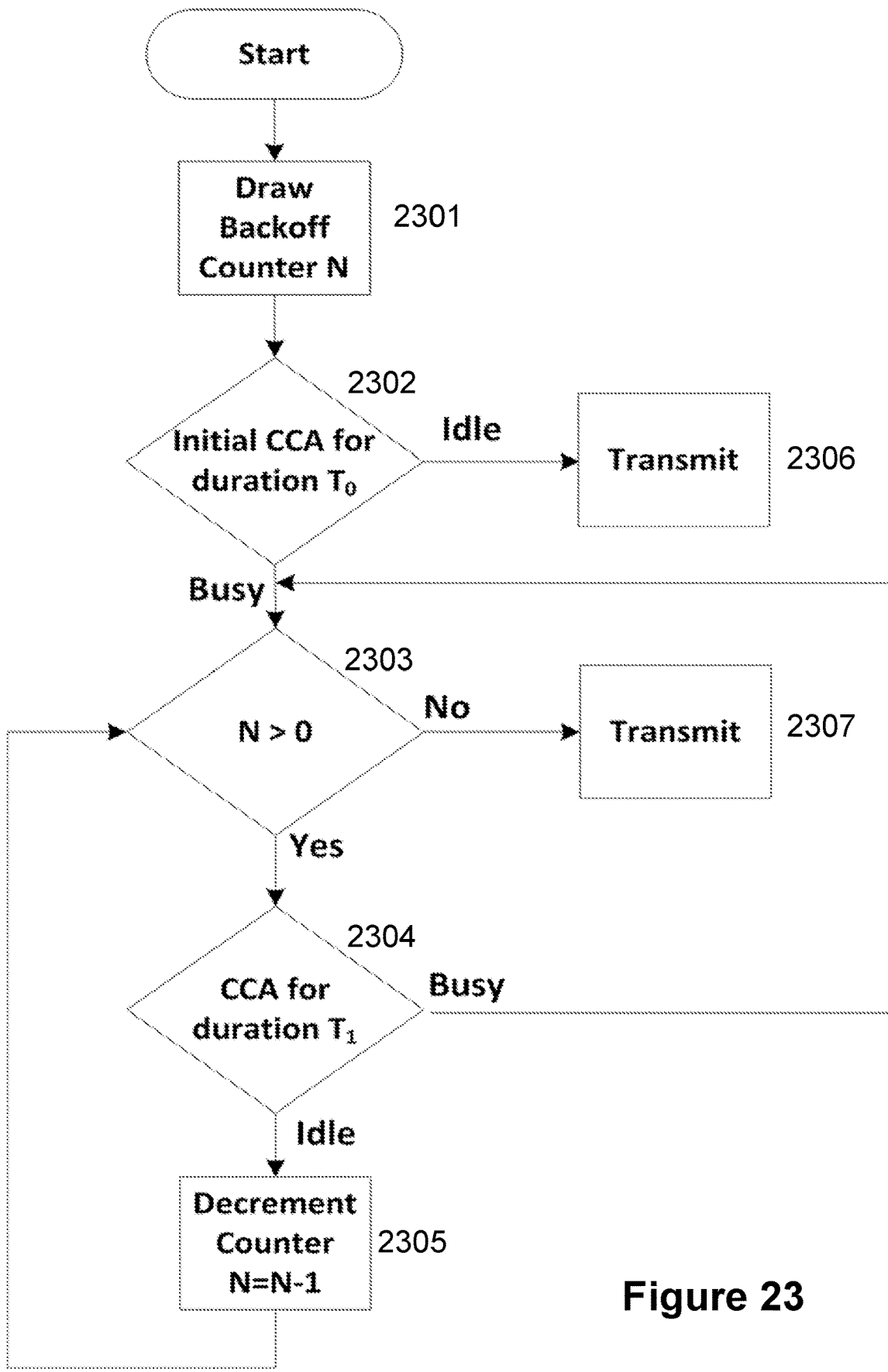
FIG. 23 is a flowchart illustrating another example for LBT for management and control information, according to embodiments herein.
Figure 24:
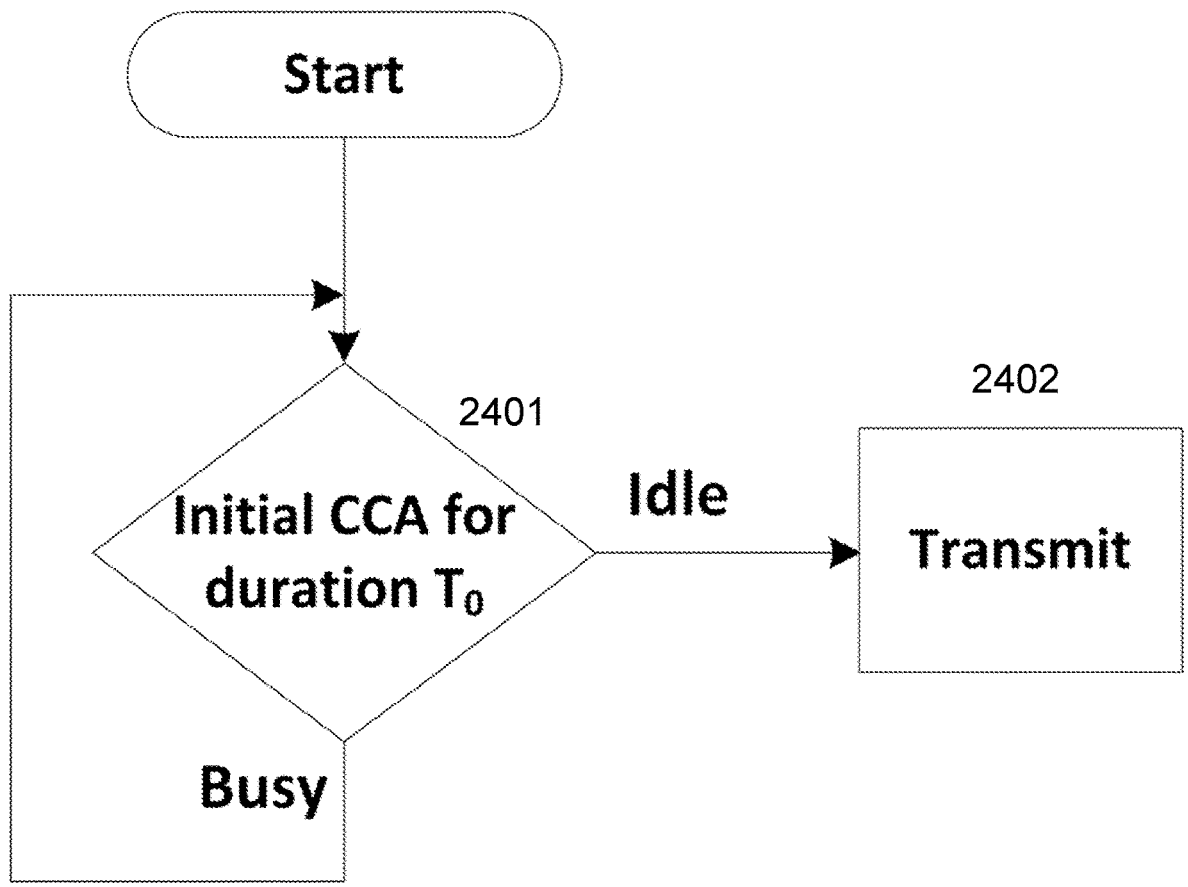
FIG. 24 is a flowchart illustrating a second example for multi carrier operation of data, according to embodiments herein.
Figure 25:
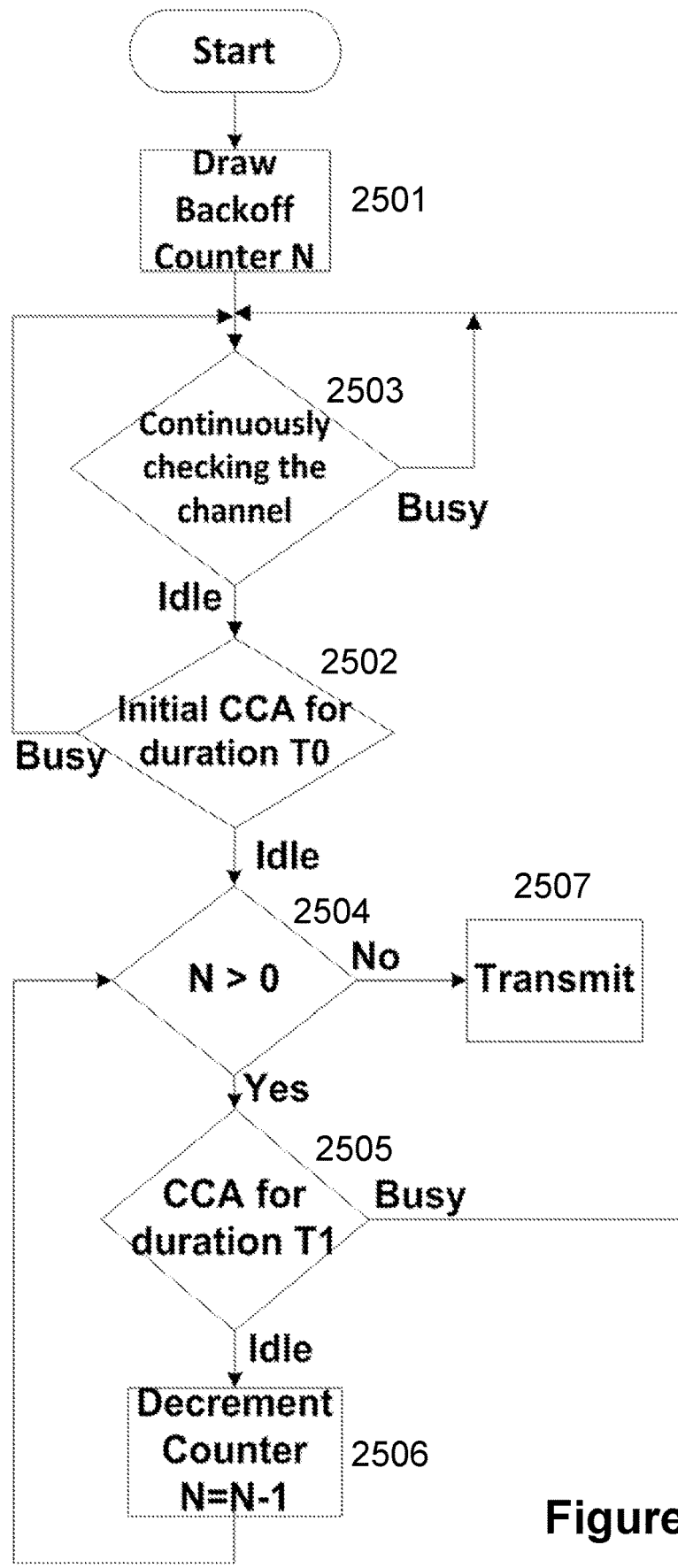
FIG. 25 is a flowchart illustrating an embodiment for data transmissions using continuous monitoring of a busy channel.

Another example for management and control information which contains an extended CCA stage with random backoff is shown in FIG. 23, for possibly better compliance with EN 301.893 regulations. At 2301, a backoff counter N is drawn, followed by an initial CCA for a duration $T_0$ at 2302. When the channel is deemed to be busy, at 2303, it is checked if N>0. If N is larger than 0, an extended CCA for a duration $T_1$ is performed at 2304, and this is followed by a count down at 2305 if this CCA declares Idle. Here, the control information may be transmitted either after the initial CCA is clear at 2306, or after the completion of the random backoff stage, at 2307. This example may provide slightly lower priority for the management and control information as compared to FIG. 22.

LBT Procedure for Multi Carrier Operation

In a first example for multi carrier operation, all carriers that a device such as the first radio node 101, may use that are about to transmit, may apply a separate LBT procedure per carrier. The LBT procedures that may be used may, for example, be the ones given in the previous examples.

In a second example, the device that is about to transmit data, e.g., the first radio node 101, may apply the LBT procedure for Data in accordance with the examples provided above under the section entitled "LBT Procedure for data transmissions" on a single carrier that may be about to use, which may be referred to as Master carrier. On at least one other carrier the device may be supposed to transmit on, the device may use the LBT procedure given in an example flowchart in FIG. 24, which may be referred to as Slave carrier. In the slave carrier, the selected method may comprise, immediately after an outcome of the first period of observation at 2401 is that the radio channel 142 is idle, allowing transmission of the information at 2402. The initial CCA duration on the slave carrier may be aligned with the last CCA duration of the Master carrier. If the slave carrier is found to be Idle, the device may use it for transmission, and if it is not found to be Idle the device may not use it for transmission.

As stated earlier, a device may either be a UE, eNB or Relay.

LBT Procedure with Continuous Monitoring

In the previous examples, monitoring of a busy medium, such as the radio channel 142, may be done in increments of a CCA duration. In the example described in this section, a busy medium may be continuously monitored until it is idle, at which time the procedure involving CCA durations may be used again. Such continuous monitoring may be used in any of the embodiments described above. Such monitoring is illustrated for data transmissions as an example and is shown in the example flowchart of FIG. 25. At 2501, a backoff counter N is drawn. Whenever the channel is found to be busy after measuring in a CCA duration for $T_0$ at 2502, the device enters a continuous checking loop where the channel is monitored at 2503 until it is found to be idle once again. Once the channel is found to be idle, an initial CCA is started once again as shown in the figure at 2502 and the listen-before-talk procedure continues with the use of CCA durations until the channel is found to be busy once again in one of the CCA durations. When the channel is deemed to be idle, after 2502, it is checked if N>0 at 2504. If N is larger than 0, an extended CCA for a duration $T_1$ is performed at 2505, and this is followed by a count down at 2506 if this CCA declares Idle. Here, transmission may occur after the completion of the random backoff stage, at 2507, that is, when N is no longer larger than 0.

Also, embodiments herein may be incorporated into any of the methods described in, for example, 3GPP TS 36.211, V11.4.0 (2013-09), 3rd Generation Partnership Project; Technical Specification Group Radio Access Network; Evolved Universal Terrestrial Radio Access (E-UTRA); Physical Channels and Modulation, Release 11, 3GPP TS 36.213, V11.4.0 (2013-09), 3rd Generation Partnership Project; Technical Specification Group Radio Access Network; Evolved Universal Terrestrial Radio Access (E-UTRA); Physical layer procedures, Release 11, and 3GPP TS 36.331, V11.5.0 (2013-09), 3rd Generation Partnership Project; Technical Specification Group Radio Access Network; Evolved Universal Terrestrial Radio Access (E-UTRA); Radio Resource Control (RRC), Release 11.

Embodiments herein may relate to L1 and L2 layers.

As an overview of the foregoing, it has been observed that reusing the LBT procedure for load-based equipment as specified in EN 301.893 regulation with the minimum CCA durations that may be required of 20 μs, potentially leads to LAA capturing the majority of the channel access opportunities and starvation of Wi-Fi devices.

Particular embodiments herein may relate to an LBT protocol for LAA that may avoid the drawbacks of existing methods described above, and ensure better coexistence with Wi-Fi, as well as other LAA nodes. How the LBT procedure may be integrated with SCell fast on/off switching and its relation with LTE subframe timing was described in R1-144267 "Initial discussion on solutions for identified functionalities for LAA", Ericsson, RAN1#78b, October 2014. Two separate procedures may be defined for LAA data transmissions and LAA management and control transmissions, respectively.

According to examples of embodiments herein, the LBT procedure for LAA data transmissions may incorporate defer periods, use a post-transmission random backoff, and always follow an initial CCA with an extended CCA stage, with example durations of 20 μs for each CCA duration.

A particular example of a described LBT procedure for LAA data transmissions is shown in FIG. 16. It may incorporate defer periods, use a post-transmission random backoff, and always follow an initial CCA with an extended CCA stage, each of duration e.g., 20 μs. Thus, the minimum time before LAA transmission may roughly match with the combination of a DIFS period and count down of one slot in Wi-Fi. This ensures that LAA and Wi-Fi have equal waiting time before they may start transmitting, for fairness purposes.

If the initial CCA deems the channel to be busy, it may then repeated; otherwise it may be followed by extended CCA. For each extended CCA duration where the channel is deemed to be unoccupied, the backoff counter N may be decremented by 1, according to Action 1503. If the channel is determined to be busy during an extended CCA, the backoff counter may be frozen, and the LBT process may revert to the initial CCA step. The data transmission may be performed immediately after the backoff counter value reaches zero, i.e., after N extended CCAs showing Idle channel state have been obtained. After each transmission burst, the LAA node may perform an extended CCA with a freshly-drawn counter N, according to Action 1505.

Also according to particular examples of embodiments herein, the LBT procedure for LAA DRS may allow transmissions immediately after an initial CCA, with an example initial CCA duration of 25 μs.

To perform the method actions described above in relation to FIGS. 14-25, the first radio node 101 is configured to operate in an LTE wireless communications network 100. The first radio node 101 comprises the following arrangement depicted in FIG. 26.

The detailed description of some of the following corresponds to the same references provided above, in relation to the actions described for the first radio node 101, and will thus not be repeated here.

The first radio node 101 is further configured to, e.g., by means of a selecting module 2601 configured to, select the LBT method based on the type of information to be transmitted to the second radio node 102 in the radio channel 142 in unlicensed spectrum. When the type of information is data, the selected method comprises to always defer transmission of the data until one of the following: A) after completion of the first period of observation of the radio channel 142, the outcome of at least the second period of observation of the radio channel 142 is that the radio channel 142 is idle, and B) the outcome of the first period of observation of the radio channel 142 and the one or more defer periods is that the radio channel 142 is idle. When the type of information is control or management information, the selected method comprises to allow transmission of the information immediately after the outcome of the first period of observation is that the radio channel 142 is idle, wherein the duration of the first period of observation is configured to provide priority to the control or management information compared to data.

The selecting module 2601 may be a processor 2608 of the first radio node 101.

In some embodiments, to select may be further configured to be based on the carrier operation type, wherein the carrier operation type may comprise multiple carrier operation, and the first radio node 101 may be further configured to one of: a) apply a separate LBT procedure per carrier, and b) apply the selected method for data on a single carrier, wherein the single carrier is a master carrier, and on at least one other carrier, apply the selected method for control and management information, wherein the at least one other carrier is a slave carrier, wherein the observation period is a CCA, and wherein an initial CCA duration on the slave carrier is aligned with a last CCA duration of the master carrier.

The radio channel 142 may be in unlicensed spectrum.

The idle periods of observation may be one or more CCA. The CCA duration may be set to be 25 μs.

In some embodiments, the CCA durations may be set to be the same for all LAA LTE nodes in the wireless communications network 100.

The first radio node 101 is further configured to, e.g., by means of a performing module 2602 configured to, perform the LBT with the selected LBT method on the radio channel 142.

The performing module 2602 may be the processor 2608 of the first radio node 101.

In some embodiments, to perform LBT with the selected method, the first radio node 101 may be further configured to, e.g., by means of a setting module 2603 configured to, set the counter to the first value, the first value being for idle periods of observation of the radio channel 142.

The setting module 2603 may be the processor 2608 of the first radio node 101.

In some embodiments, the first radio node 101 may be further configured to, e.g., by means of the setting module 2603, to after transmitting the data, set the counter to a second value, wherein after the setting the counter to the second value, the deferring and the transmitting are configured to be performed for a new set of data.

The first value may be configured to remain unchanged after the outcome of one of:
a) the first period of observation and b) the one of the at least second period of observation of the radio channel 142 is that the radio channel 142 is busy.

The counter may be derived from a common random seed, and the common random seed may be configured to be communicated to one or more wireless devices.

In some embodiments, to perform LBT with the selected method, the first radio node 101 may be further configured to, e.g., by means of a deferring module 2604 configured to, always defer transmission of the data until one of: A) after completion of the first period of observation of the radio channel 142, the outcome of at least the second period of observation of the radio channel 142 is that the radio channel 142 is idle, and B) the outcome of the first period of observation of the radio channel 142 and one or more defer periods is that the radio channel 142 is idle.

The deferring module 2604 may be the processor 2608 of the first radio node 101.

In some embodiments, to perform LBT with the selected method, the first radio node 101 may be further configured to, e.g., by means of a decrementing module 2605 configured to, decrement the first value by one, only after the outcome of one of: a) the first period of observation, and b) one of the at least one second period of observation of the radio channel 142, is that the radio channel 142 is idle.

The decrementing module 2605 may be the processor 2608 of the first radio node 101.

In some embodiments, to perform LBT with the selected method, the first radio node 101 may be further configured to, e.g., by means of a transmitting module 2606 configured to, transmit data or control or management information. In some embodiments, the first radio node 101 may be further configured to transmit the data after the counter reaches the threshold.

The transmitting module 2606 may be the processor 2608 of the first radio node 101.

In some embodiments, the first radio node 101 may be further configured to, whenever the radio channel 142 is found to be busy, continuously monitor the radio channel 142, by the first radio node 101, until the radio channel 142 is found to be idle.

Figure 26:
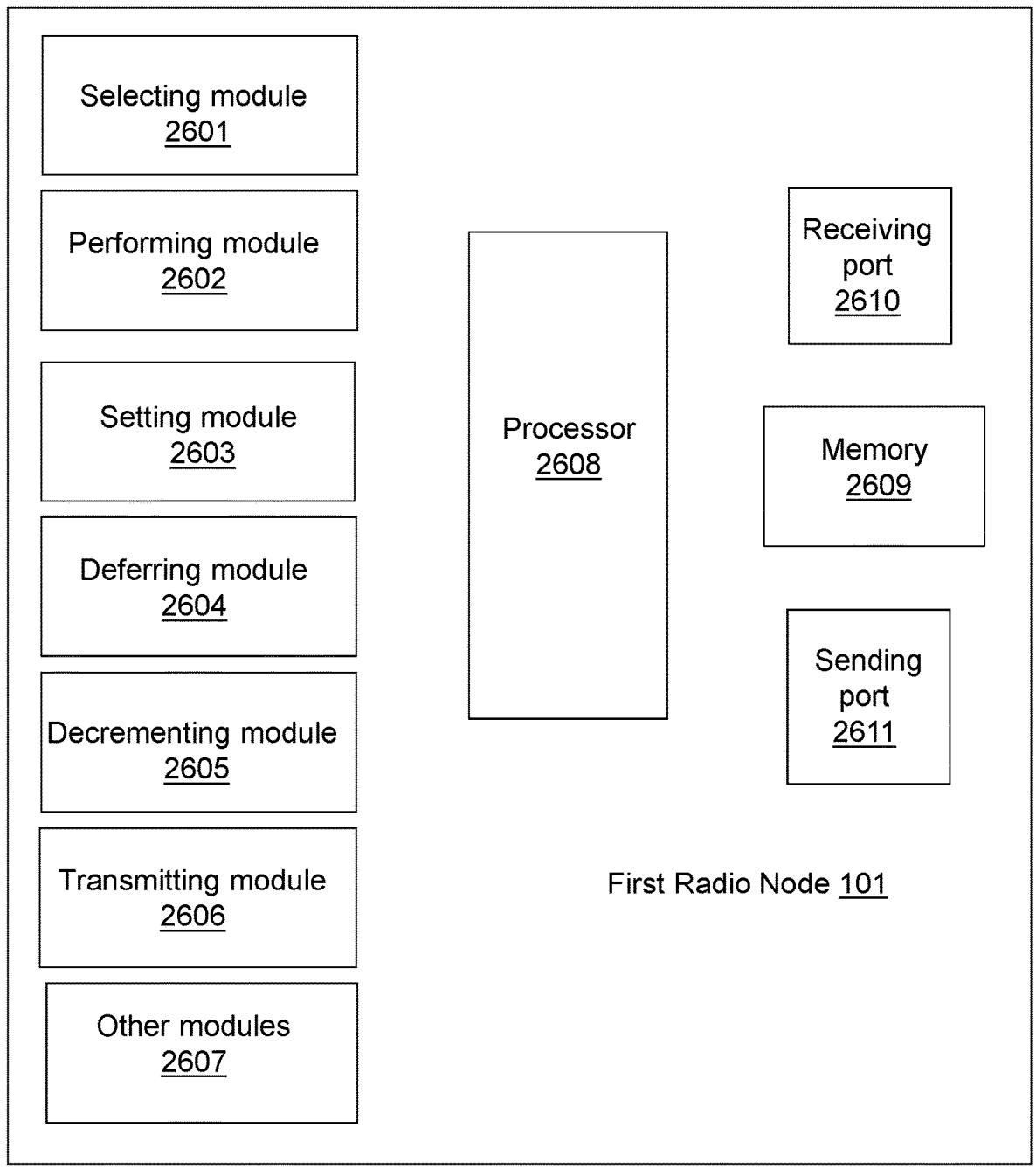
FIG. 26 is a schematic block diagram illustrating embodiments of a first radio node, according to embodiments herein.

The embodiments herein may be implemented through one or more processors, such as the processor 2608 in the first radio node 101 depicted in FIG. 26, together with computer program code for performing the functions and actions of the embodiments herein. That is, it will be understood that any reference herein to the processor 2608 may be understood as a processing circuitry comprising one or more processors. The program code mentioned above may also be provided as a computer program product, for instance in the form of a data carrier carrying computer program code for performing the embodiments herein when being loaded into the in the first radio node 101. One such carrier may be in the form of a CD ROM disc. It is however feasible with other data carriers such as a memory stick. The computer program code may furthermore be provided as pure program code on a server and downloaded to the first radio node 101.

The first radio node 101 may further comprise a memory 2609, respectively, comprising one or more memory units. The memory 2609 is arranged to be used to store obtained information, store data, configurations, schedulings, and applications etc. to perform the methods herein when being executed in the first radio node 101.

In some embodiments, the first radio node 101 may receive information through a receiving port 2610. In some embodiments, the receiving port 2610 may be, for example, connected to the one or more antennas in first radio node 101. In other embodiments, the first radio node 101 may receive information from another structure in the wireless communications network 100 through the receiving port 2610. Since the receiving port 2610 may be in communication with the processor 2608, the receiving port 2610 may then send the received information to the processor 2608. The receiving port 2610 may also be configured to receive other information.

The processor 2608 in the first radio node 101 may be further configured to transmit or send information through a sending port 2611, which may be in communication with the processor 2608, and the memory 2609.

Those skilled in the art will also appreciate that the selecting module 2601, the performing module 2602, the setting module 2603, the deferring module 2604, the decrementing module 2605, the transmitting module 2606, and the other modules 2607 described above may refer to a combination of analog and digital modules, and/or one or more processors configured with software and/or firmware, e.g., stored in memory, that, when executed by the one or more processors such as the processor 2608, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 2601-2607 described above may be implemented as one or more applications running on one or more processors such as the processor 2608.

Thus, the methods according to the embodiments described herein for the first radio node 101 may be implemented by means of a computer program product, comprising instructions, i.e., software code portions, which, when executed on at least one processor, cause the at least one processor to carry out the actions described herein, as performed by the first radio node 101. The computer program product may be stored on a computer-readable storage medium. The computer-readable storage medium, having stored thereon the computer program, may comprise instructions which, when executed on at least one processor, cause the at least one processor to carry out the actions described herein, as performed by the first radio node 101. In some embodiments, the computer-readable storage medium may be a non-transitory computer-readable storage medium, such as a CD ROM disc, or a memory stick. In other embodiments, the computer program product may be stored on a carrier containing the computer program just described, wherein the carrier is one of an electronic signal, optical signal, radio signal, or the computer-readable storage medium, as described above.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention. It is to be understood that the embodiments are not to be limited to the specific examples disclosed, and that modifications and other variants are intended to be included within the scope of this disclosure. Although specific terms may be employed herein, they are used in a generic and descriptive sense only and not for purposes of limitation.

According the description just provided, embodiments herein may be related to the following example methods:

Several embodiments are comprised herein. More specifically the following are radio node related embodiments.

Figure 14:
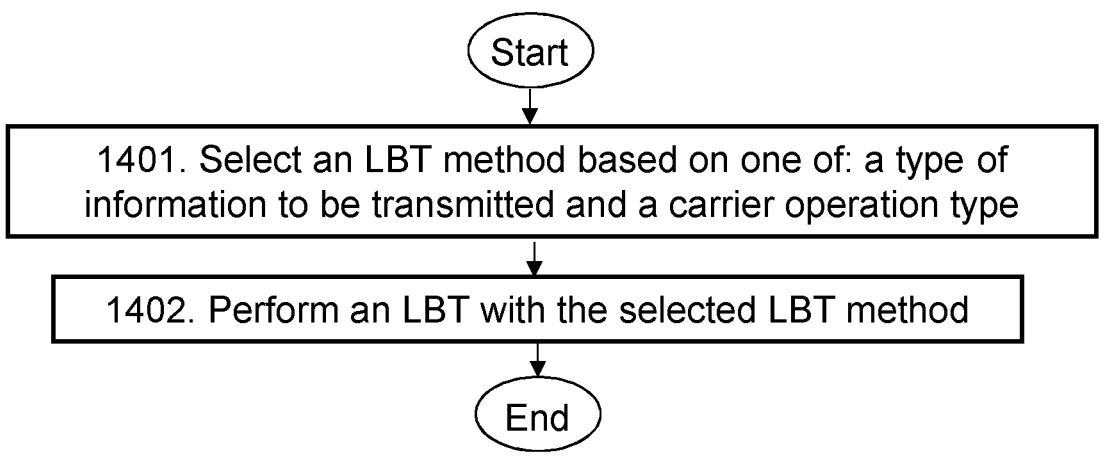
FIG. 14 is a flowchart depicting embodiments of a method in a first radio node, according to embodiments herein.
Figure 15:
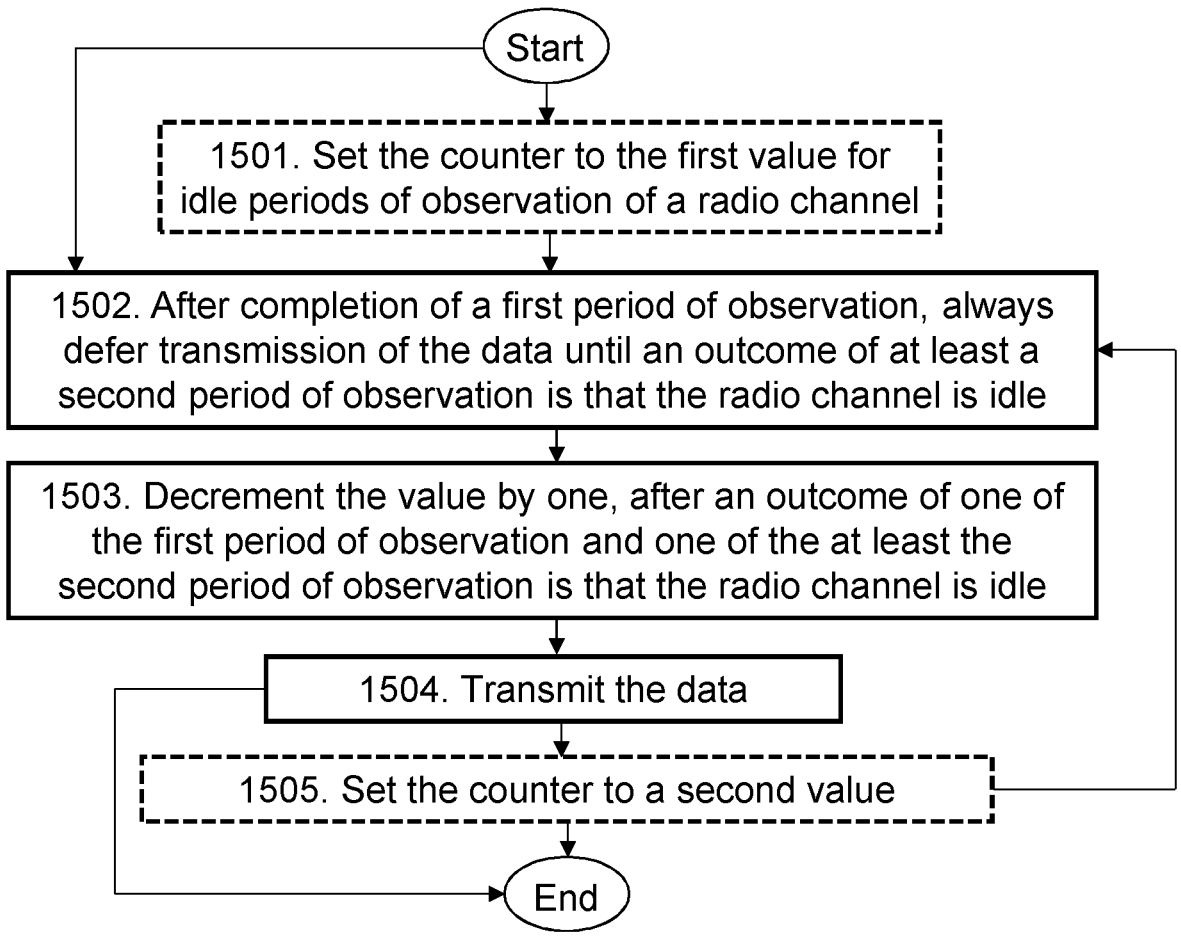
FIG. 15 is a flowchart depicting embodiments of a method in a first radio node, according to embodiments herein.

The radio node embodiments relate to FIGS. 14, 15 and 26.

A method performed by a radio node such as the first radio node 101 may comprise the actions of:

setting 1501 the counter to a first value, the first value being for idle periods of observation of a radio channel 142. The radio channel 142 is wherein data may be transmitted by the first radio node 101. The idle periods of observation may be, for example, one or more CCAs. The first radio node 101 may be configured to perform this action, e.g. by means of the setting module 2601 within the first radio node 101. The setting module 2601 may be the processor 2608 of the first radio node 101, or an application running on such processor;

after completion of a first period of observation of the radio channel 142, always deferring 1502 transmission of the data until the outcome of at least a second period of observation of the radio channel 142 is that the radio channel 142 is idle. The first period of observation may be the initial CCA. The second period of observation may be part of an extended period of observation or extended CCA stage. Each of the periods of observation may have a duration of 20 μs. The first radio node 101 may be configured to perform this action, e.g. by means of the deferring module 2602 within the first radio node 101. The deferring module 2602 may be the processor 2608 of the first radio node 101, or an application running on such processor;

decrementing 1503 the value by one, only after the outcome of one of the first period of observation and one of the at least the second period of observation of the radio channel 142 is that the radio channel 142 is idle. The value may remain unchanged after an outcome of one of the first period of observation and one of the at least the second period of observation of the radio channel 142 is that the radio channel 142 is busy. The first radio node 101 may be configured to perform this action, e.g. by means of the decrementing module 2603 within the first radio node 101. The decrementing module 2603 may be the processor 2608 of the first radio node 101, or an application running on such processor;

transmitting 1504 the data in the radio channel 142 after the outcome of the at least second period of observation of the radio channel 142 is that the radio channel 142 is idle. The transmission of the date may be done to another node, or second node. The other node, other radio node or second node may be any of the first wireless device 120 or the network node 110, or another wireless device or network node in the wireless communications network with the first radio node 101 keeps a radio channel of similar characteristics to that of the radio channel 142. The transmitting may be performed only after the counter reaches a threshold. The first radio node 101 may be configured to perform this action, e.g. by means of the transmitting module 2604 within the first radio node 101. The transmitting module 2604 may be the processor 2608 of the first radio node 101, or an application running on such processor;

after transmitting the data, setting 1505 the counter to a second value, that is, restarting the timer. After setting the counter to the second value, the deferring and transmitting may be performed for a new set of data. The first radio node 101 may be configured to perform this action, e.g. by means of the setting module 2601 within the first radio node 101.

The method performed by the first radio node 101 may further comprise continuous monitoring of the radio channel 142.

The first radio node 101 may comprise an interface unit to facilitate communications between the first radio node 101 and other nodes or devices, e.g., any of the network node 110 and the wireless device 120. The interface may, for example, include a transceiver configured to transmit and receive radio signals over an air interface in accordance with a suitable standard.

Embodiments herein may also relate to a method performed by a radio node such as the first radio node 101 which method may comprise the actions of:

selecting 1401 an LBT method based on one of: a type of information to be transmitted and a carrier operation type. The LBT method may be for LTE in unlicensed spectrum. The LBT method may comprise at least one of: one or more defer periods, utilization of a post-transmission random backoff, and always following a first period of observation of the radio channel 142, with a second period of observation of the radio channel 142, as described above. The LBT method may comprise, for example, a first LBT method comprising any of the actions 1501-1505 described above. In some embodiments, this first LBT method may be performed when the type of information is data. The LBT method may comprise, for example, a second LBT method comprising allowing transmission immediately after the first period of observation. In these embodiments, the first period of observation may have a duration of 25 μs. The first period of observation may be an initial CCA. In some embodiments, this second LBT method may be performed when the type of information is control or management information. The carrier operation type may comprise multiple carrier operation. Any of the LBT methods may comprise continuous monitoring of the radio channel 142. The first radio node 101 may be configured to perform this action, e.g. by means of the selecting module 2605 within the first radio node 101. The selecting module 2605 may be the processor 2608 of the first radio node 101, or an application running on such processor;

performing 1402 LBT with the selected method on the radio channel 142. The first radio node 101 may be configured to perform this action, e.g. by means of the performing module 2606 within the first radio node 101. The performing module 2606 may be a processor 2608 of the first radio node 101, or an application running on such processor.

The invention claimed is:

1. A method performed by a first radio node, the first radio node being configured to operate in a Long Term Evolution, LTE, wireless communications network, the method comprising:
  selecting a Listen-Before-Talk, LBT, method based on a type of information to be transmitted to a second radio node in a radio channel in unlicensed spectrum;
  performing an LBT with the selected LBT method on the radio channel;
  when the type of information is data, the selected method comprises always deferring transmission of the data until one of: a) after completion of a first period of observation of the radio channel in which an outcome of the first period of observation of the radio channel is that the radio channel is idle, an outcome of at least a second period of observation of the radio channel is that the radio channel is idle, and b) an outcome of a first period of observation of the radio channel and one or more defer periods is that the radio channel is idle; and
  when the type of information is one of control and management information, the selected method comprises allowing transmission of the information immediately after an outcome of the first period of observation is that the radio channel is idle, a duration of the first period of observation providing priority to the one of the control and the management information compared to data.

2. The method according to claim 1, wherein the selected method further comprises:
setting a counter to a first value, the first value being for idle periods of observation of a radio channel;
decrementing the first value by one, only after an outcome of one of: a) the first period of observation and b) one of the at least one second period of observation of the radio channel, is that the radio channel is idle; and
transmitting the data after the counter reaches a threshold.

3. The method according to claim 2, further comprising:
after transmitting the data, setting the counter to a second value, wherein after the setting the counter to the second value, the deferring and the transmitting are performed for a new set of data.

4. The method according to claim 2, wherein the first value remains unchanged after the outcome of one of: a) the first period of observation and b) the one of the at least second period of observation of the radio channel is that the radio channel is busy.

5. The method according to claim 2, wherein the counter is derived from a common random seed, and wherein the common random seed is communicated to one or more wireless devices.

6. The method according to claim 1, wherein the selecting is further based on a carrier operation type, wherein the carrier operation type comprises multiple carrier operation, and wherein the method further comprises one of: a) applying a separate LBT procedure per carrier, and b) applying the selected method for data on a single carrier, wherein the single carrier is a master carrier, and on at least one other carrier, applying the selected method for control and management information, wherein the at least one other carrier is a slave carrier, wherein the observation period is a Clear Channel Assessment, CCA, and wherein an initial CCA duration on the slave carrier is aligned with a last CCA duration of the master carrier.

7. The method according to claim 1, further comprising, whenever the radio channel is found to be busy, continuous monitoring of the radio channel, by the first radio node, until the radio channel is found to be idle.

8. The method according to claim 1, wherein the idle periods of observation are one or more CCA.

9. The method according to claim 8, wherein a CCA duration is set to be 25 µs.

10. The method according to claim 8, wherein CCA durations are set to be the same for all License Assisted Access, LAA, LTE nodes in the wireless communications network.

11. A non-transitory computer-readable storage medium, having stored thereon a computer program comprising instructions which, when executed on at least one processor of a first radio node configured to operate in a Long Term Evolution, LTE, wireless communications network, cause the at least one processor to perform a method, the method comprising:
selecting a Listen-Before-Talk, LBT, method based on a type of information to be transmitted to a second radio node in a radio channel in unlicensed spectrum;
performing an LBT with the selected LBT method on the radio channel;
when the type of information is data, the selected method comprises always deferring transmission of the data until one of: a) after completion of a first period of observation of the radio channel in which an outcome of the first period of observation of the radio channel is that the radio channel is idle, an outcome of at least a second period of observation of the radio channel is that the radio channel is idle, and b) an outcome of a first period of observation of the radio channel and one or more defer periods is that the radio channel is idle; and
when the type of information is one of control and management information, the selected method comprises allowing transmission of the information immediately after an outcome of the first period of observation is that the radio channel is idle, a duration of the first period of observation providing priority to the one of the control and the management information compared to data.

12. A first radio node configured to operate in a Long Term Evolution, LTE, wireless communications network, the first radio node being further configured to:
select a Listen-Before-Talk, LBT, method based on a type of information to be transmitted to a second radio node in a radio channel in unlicensed spectrum;
perform an LBT with the selected LBT method on the radio channel;
when the type of information is data, the selected method comprises always deferring transmission of the data until one of: a) after completion of a first period of observation of the radio channel in which an outcome of the first period of observation of the radio channel is that the radio channel is idle, an outcome of at least a second period of observation of the radio channel is that the radio channel is idle, and b) an outcome of a first period of observation of the radio channel and one or more defer periods is that the radio channel is idle; and
when the type of information is one of control and management information, the selected method comprises allowing transmission of the information immediately after an outcome of the first period of observation is that the radio channel is idle, a duration of the first period of observation providing priority to the one of the control and the management information compared to data.

13. The first radio node according to claim 12, wherein to perform LBT with the selected method, the first radio node is further configured to:
set a counter to a first value, the first value being for idle periods of observation of a radio channel;
decrement the first value by one, only after an outcome of one of: a) the first period of observation and b) one of the at least one second period of observation of the radio channel, is that the radio channel is idle; and
transmit the data after the counter reaches a threshold.

14. The first radio node according to claim 13, being further configured to:
after transmitting the data, set the counter to a second value, wherein after the setting the counter to the second value, the deferring and the transmitting are configured to be performed for a new set of data.

15. The first radio node according to claim 13, wherein the first value is configured to remain unchanged after the outcome of one of: a) the first period of observation and b) the one of the at least second period of observation of the radio channel is that the radio channel is busy.

16. The first radio node according to claim 13, wherein the counter is derived from a common random seed, and wherein the common random seed is configured to be communicated to one or more wireless devices.

17. The first radio node according to claim 12, wherein the selecting is further based on a carrier operation type, wherein the carrier operation type comprises multiple carrier operation, and wherein the first radio node is further configured to one of: a) apply a separate LBT procedure per carrier, and b) apply the selected method for data on a single carrier, wherein the single carrier is a master carrier, and on at least one other carrier, apply the selected method for control and management information, wherein the at least one other carrier is a slave carrier, wherein the observation period is a Clear Channel Assessment, CCA, and wherein an initial CCA duration on the slave carrier is aligned with a last CCA duration of the master carrier.

18. The first radio node according to claim 12, further configured to, whenever the radio channel is found to be busy, continuously monitor the radio channel, by the first radio node, until the radio channel is found to be idle.

19. The first radio node according to claim 12, wherein the idle periods of observation are one or more CCA.

20. The first radio node according to claim 19, wherein a CCA duration is set to be 25 µs.

21. The first radio node according to claim 19, wherein CCA durations are set to be the same for all License Assisted Access, LAA, LTE nodes in the wireless communications network.

\* \* \* \* \*

UNITED STATES PATENT AND TRADEMARK OFFICE
CERTIFICATE OF CORRECTION

Page 1 of 2

PATENT NO. : 10,560,963 B2
APPLICATION NO. : 15/524985
DATED : February 11, 2020
INVENTOR(S) : Mukherjee et al.

It is certified that error appears in the above-identified patent and that said Letters Patent is hereby corrected as shown below:

In the Specification

Column 24, Lines 66-67, delete "setting module 2601" and insert -- setting module 2603 --, therefor.

Columns 24 & 25, Lines 67 & 1, delete "setting module 2601" and insert -- setting module 2603 --, therefor.

Column 25, Line 14, delete "deferring module 2601" and insert -- deferring module 2604 --, therefor.

Column 25, Line 15, delete "deferring module 2601" and insert -- deferring module 2604 --, therefor.

Column 25, Lines 28-29, delete "decrementing module 2603" and insert -- decrementing module 2605 --, therefor.

Column 25, Lines 29-30, delete "decrementing module 2603" and insert -- decrementing module 2605 --, therefor.

Column 25, Lines 46-47, delete "transmitting module 2604" and insert -- transmitting module 2606 --, therefor.

Column 25, Lines 47-48, delete "transmitting module 2604" and insert -- transmitting module 2606 --, therefor.

Column 25, Line 56, delete "setting module 2601" and insert -- setting module 2603 --, therefor.

Column 26, Line 30, delete "selecting module 2605" and insert -- selecting module 2601 --, therefor.

Column 26, Line 31, delete "selecting module 2605" and insert -- selecting module 2601 --, therefor.

Signed and Sealed this
Ninth Day of June, 2020

Andrei Iancu
*Director of the United States Patent and Trademark Office*

Column 26, Line 37, delete "performing module 2606" and insert -- performing module 2602 --, therefor.

Column 26, Line 38, delete "performing module 2606" and insert -- performing module 2602 --, therefor.